(12) United States Patent
Lah

(10) Patent No.: US 7,810,514 B2
(45) Date of Patent: Oct. 12, 2010

(54) CONNECTOR FOR TENT POLES

(76) Inventor: Jeh-kun Lah, 542-3 Gajwa-Dong, Suh-Gu, Incheon (KR) 404-250

( * ) Notice: Subject to any disclaimer, the term of this patent is extended or adjusted under 35 U.S.C. 154(b) by 559 days.

(21) Appl. No.: 11/797,129

(22) Filed: May 1, 2007

(65) Prior Publication Data

US 2008/0271769 A1 Nov. 6, 2008

(51) Int. Cl.
*E04H 15/32* (2006.01)
*E04H 15/36* (2006.01)
(52) U.S. Cl. .................. 135/120.3; 135/127; 135/120.1
(58) Field of Classification Search ......... 135/124–128, 135/132, 133, 135, 147, 120.3, 143, 114, 135/120.1, 906, 909; 403/218, 353, 409.1, 403/DIG. 12, 396, 394, 400
See application file for complete search history.

(56) References Cited

U.S. PATENT DOCUMENTS 550,673 A * 12/1895 Beron .......................... 174/147

FOREIGN PATENT DOCUMENTS

| KR | 20-0250665 | 11/2001 |
|---|---|---|
| KR | 20-0304799 | 2/2003 |

* cited by examiner

*Primary Examiner*—David Dunn
*Assistant Examiner*—Danielle Jackson
(74) *Attorney, Agent, or Firm*—Nixon Peabody LLP; Jeffrey L. Costellia

(57) ABSTRACT

A connector for tent poles has a body consisting of a single piece on the whole, an approximate half part of the body constituting a first connection part which a single pole assembly passes through and is connected to, the other approximate half part of the body constituting a second connection part to which another pole assembly or a clip is connected, a pivot hole consisting of a base hole formed through the first connection part in a direction traversing a longitudinal axis of the body and having a size corresponding to an outer diameter of the pole assembly at a central point of a cross section of the first connection part and an expansion hole widely expanded in a radially outward direction of the body from both front and rear sides of the base hole so as to correspond to a swiveling trajectory of the pole assembly so that the pole assembly is able to swivel by a predetermined angle on any plane intersecting the longitudinal axis of the body, around the base hole of a swivel center, and pivot protrusions that are fitted into a gap between an end face of a male pole and an end face of a female pole of the pole assembly so as to serve as a pivot point combining the swiveling and position-fixing functions of the pole assembly, have respectively a cam surface following a swiveling trajectory delineated by the two end faces and are formed at two points opposite to each other in the base hole of each pivot hole.

13 Claims, 33 Drawing Sheets

CONNECTOR FOR TENT POLES

BACKGROUND OF THE INVENTION

1. Field of the Invention

The present invention relates to a connector for tent poles enabling a pole assembly of a tent to be connected to another pole assembly or tent, and more particularly, to a connector for tent poles, which consists of a single body, enables pole assemblies to swivel, thereby connecting the pole assemblies in various intersecting angles and prevents the pole assemblies from deviating from predetermined points.

2. Description of the Prior Art

A tent provides a residential space allowing a user to temporarily reside outdoors for the mountain climbing or camping. As shown in FIG. 29, a tent 10 consists of, in general, waterproof fabric 20 and plural pole assemblies 30. The waterproof fabric 20 provides an indoor space by expansion and the pole assemblies 30 support the waterproof fabric 20 as it is expanded. The pole assemblies 30 are made by fitting poles each other, each of which has a small length. Under state that the pole assemblies 30 are bent into a fixed shape such as arch shape, when clips 21 or sleeves provided to the waterproof fabric 20 are connected, the waterproof fabric 20 is stretched due to elastic force of the pole assemblies 30, so that a residential space is secured indoors.

In the tent 10, a connector is required at a top point P1 at which the pole assemblies 30 intersect. The connector connects the intersecting pole assemblies 30, so that it prevents the pole assemblies 30 from sliding at the intersecting point, thereby preventing the shape of the tent 10 from being deformed (collapsed).

As shown in FIG. 29, a ventilation window 22 is provided to a side of the waterproof fabric 20 and a visor 23 for shutting out the rain is provided to the ventilation window 22. In such a tent, it is required connectors for connecting ends of the pole assembly 30 for supporting the visor 23 to the pole assemblies 30 of the tent main body, i.e., connectors to be applied to P2 points.

Conventionally, improved connectors for connecting the intersecting pole assemblies, which are adapted to be applied in various intersecting angles, are disclosed in Korean Utility Model Registration Nos. 20-0250665 and 20-0304799, which were filed by the applicant.

FIGS. 30 to 33 show two representative examples of connectors disclosed in the above documents. In a connector 50 shown in FIGS. 30 and 31, a first body 60 and a second body 70 each having a hole 61, 71, through which pole assemblies 1, 2 pass respectively, are separately provided and are rotatably connected to each other by connection parts 62, 72.

Likewise, in a connector 50-1 shown in FIGS. 32 and 33, a first body 60-1 and a second body 70-1 each having a hole 61-1, 71-1, through which pole assemblies 1, 2 pass respectively, are separately provided and are rotatably connected to each other by connection parts 62-1, 72-1.

Like this, since each of the conventional connectors for connecting the intersecting pole assemblies has the two connected bodies, which are separately divided, the rotation parts of the two bodies are apt to be damaged due to the rain, dust and the like. In addition, since the two bodies should be separately manufactured, the manufacturing cost is high and it is difficult to process the connection parts of the two bodies.

In the mean time, in the connector for connecting the pole assembly 31 for supporting the visor 23 to the pole assemblies 30 of the main body at the P2 points of FIG. 29, the intersecting angles of the pole assembly 31 of the visor 23 and the pole assemblies 30 of the main body may be different depending on the tent types. Accordingly, it is most preferable to cope with the various intersecting angles with the single connector only. However, it has not been developed a connector for visor to this end. As a result, different types of the connectors have been provided depending on the tent types (depending on the intersecting angles). Accordingly, the molds for manufacturing the connector for visor should be prepared for each of the tent types, so that the costs are increased.

In the mean time, the clips 21 at the P3 points in FIG. 29 have such a structure that loops thereof are simply hooked on the pole assemblies 30. Therefore, when it is blowing a gale, the clips 21 slide along the surfaces of the pole assemblies 30, so that the tent is collapsed.

SUMMARY OF THE INVENTION

Accordingly, the present invention has been made to solve the above problems. An object of the invention is to provide a connector for tent poles, which consists of a single body, enables pole assemblies to swivel, thereby connecting the pole assemblies in various intersecting angles and prevents the pole assemblies from deviating from predetermined points.

In order to achieve the above object, there is provided a connector for tent poles comprising:

a body consisting of a single piece on the whole, an approximate half part of the body constituting a first connection part which a single pole assembly passes through and is connected to, the other approximate half part of the body constituting a second connection part to which another pole assembly or a clip is connected; and a pivot hole enabling the pole assembly to pass through the first connection part of the body and maintaining the pole assembly to swivel in the hole by a predetermined angle, wherein the pivot hole includes, a base hole formed through the first connection part in a direction traversing a longitudinal axis of the body and having a size corresponding to an outer diameter of the pole assembly at a central point of a cross section of the first connection part; and an expansion hole widely expanded in a radially outward direction of the body from both front and rear sides of the base hole so as to correspond to a swiveling trajectory of the pole assembly so that the pole assembly is able to swivel by a predetermined angle on any plane intersecting the longitudinal axis of the body, around the base hole of a swivel center.

According to the invention, the pole assembly can swivel by a predetermined angle on any plane due to the pivot hole of the first connection part while its position is fixed. Accordingly, the pole assembly connected to the first connection part can form various intersection angles with respect to another pole assembly or clip to be connected to the second connection part.

Herein, a pivot protrusion is preferably formed in the base hole of the pivot hole, which is fitted into a gap between an end face of a male pole and an end face of a female pole of the pole assembly so as to serve as a pivot point combining the swiveling and position-fixing functions of the pole assembly and has a cam surface following a swiveling trajectory delineated by the two end faces. According to this structure, the pole assembly smoothly swivels by the guide of the pivot protrusion and the pole assembly does not deviate from the connection point due to the stopping action of the pivot protrusion.

According to the invention, the second connection part has preferably a pivot hole and a pivot protrusion, which are same as the pivot hole and the pivot protrusion of the first connection part, so as to connect another pole assembly to swivel. According to this structure, the two pole assemblies can swivel by predetermined angles, respectively, so that the intersecting angles of a broader range can be formed.

Herein, when the penetration direction of the pivot hole of the first connection part is made to be different from the penetration direction of the pivot hole of the second connection part, it is possible to select the more various intersecting angles.

According to the invention, the second connection part may have a through-hole through which another pole assembly passes. According to this structure, it is possible to swivel only the pole assembly of the two pole assemblies, which is connected to the first connection part.

Herein, a stop protrusion may be formed at an inner periphery of a longitudinal center part of the through-hole of the second connection part, which protrusion is fitted in a gap between the end face of the male pole and the end face of the female pole of the pole assembly, thereby blocking longitudinal movements of the male pole and the female pole.

In addition, according to the invention, at least one of the first and second connection parts may be formed with an opening which enables an elastic string of the pole assembly to pass through the pivot hole or through-hole thereof. According to this structure, it is possible to easily connect to the connector the pole assembly whose poles are connected with the elastic string.

In addition, according to the invention, the second connection part may consist of a clip connection part for connecting a clip.

Furthermore, when the second connection part has the pivot hole or pivot protrusion same as the pivot hole or pivot protrusion of the first connection part or the through-hole, as described above, the second connection part may be a type in which the clip connection part further extends from an end of the second connection part.

In the mean time, according to the invention, there is provided a connector for tent poles, comprising:

a cylindrical body consisting of a single piece on the whole; and pivot holes formed through the cylindrical body in a direction traversing a longitudinal axis of the body at two or more points in the longitudinal direction of the cylindrical body, wherein each pivot hole includes a base hole provided to enable a pole assembly to pass through and to maintain the pole assembly to swivel in the hole by a predetermined angle, passing through in the direction traversing the longitudinal axis of the body and having a size corresponding to an outer diameter of the pole assembly at a central point of a cross section of the body, and an expansion hole widely expanded in a radially outward direction of the body from both front and rear sides of the base hole so as to correspond to a swiveling trajectory of the pole assembly so that the pole assembly is able to swivel by a predetermined angle on any plane intersecting the longitudinal axis of the body, around the base hole of a swivel center, and wherein each pivot hole is provided with pivot protrusions that are fitted into a gap between an end face of a male pole and an end face of a female pole of the pole assembly so as to serve as a pivot point combining the swiveling and position-fixing functions of the pole assembly, have respectively a cam surface following a swiveling trajectory delineated by the two end faces and are formed at two points opposite to each other in the base hole of each pivot hole.

On the other hand, there is provided a connector for tent poles comprising:

a body consisting of a single piece;

a first connection part forming a ring shape at one end of the body and formed at a center thereof with a pivot hole passing through in a direction traversing a longitudinal axis of the body; and a second connection part forming a ring shape at the other end of the body and formed at a center thereof with a pivot hole passing through in a direction traversing a longitudinal axis of the body, wherein each pivot hole includes a base hole provided to enable a pole assembly to pass through and to maintain the pole assembly to swivel in the hole by a predetermined angle, passing through in the direction traversing the longitudinal axis of the body and having a size corresponding to an outer diameter of the pole assembly at a central point of a cross section of the body, and an expansion hole widely expanded in a radially outward direction of the body from both front and rear sides of the base hole so as to correspond to a swiveling trajectory of the pole assembly so that the pole assembly is able to swivel by a predetermined angle on any plane intersecting the longitudinal axis of the body, around the base hole of a swivel center, and wherein each pivot hole is provided with pivot protrusions that are fitted into a gap between an end face of a male pole and an end face of a female pole of the pole assembly so as to serve as a pivot point combining the swiveling and position-fixing functions of the pole assembly, have respectively a cam surface following a swiveling trajectory delineated by the two end faces and are formed at two points opposite to each other in the base hole of each pivot hole.

Further, according to the invention, there is provided a connector for tent poles comprising:

a single-piece body of a first connection part and a second connection part, wherein the first connection part includes, a pivot hole consisting of a base hole that is provided to enable a pole assembly to pass through and to maintain the pole assembly to swivel in the hole by a predetermined angle, passes through the first connection part and has a size corresponding to an outer diameter of the pole assembly at a central point of the first connection part, and an expansion hole that is widely expanded in a radially outward direction of the body from both front and rear sides of the base hole so as to correspond to a swiveling trajectory of the pole assembly so that the pole assembly is able to swivel by a predetermined angle on any plane around the base hole of a swivel center, and pivot protrusions that are fitted into a gap between an end face of a male pole and an end face of a female pole of the pole assembly so as to serve as a pivot point combining the swiveling and position-fixing functions of the pole assembly, have respectively a cam surface following a swiveling trajectory delineated by the two end faces and are formed at two points opposite to each other in the base hole of each pivot hole, and wherein the second connection part integrally extends from one side of the first connection part while forming a predetermined angle for a central axis of the pivot hole and the extension part is formed with an insertion recess into which an end of another pole assembly is able to be inserted.

According to the above structure, in a tent having a visor provided to a main body of the tent, in particular, when an end of a pole assembly for a visor is inserted into the insertion recess of the second connection part and a pole assembly for a main body is allowed to pass through the first connection part, it is possible to adjust an angle of the pole assembly for a visor within an angle range that is set for the pole assembly for a main body. Therefore, it is possible to mount the visor in the various intersecting angles with a single connector.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

A connector of the invention consists of a single body and enables a pole assembly to swivel by a predetermined angle, thereby changing an intersecting angle of the pole assembly within the swiveling angle range.

Embodiment 1

FIGS. 1 to 8 show a connector for tent poles according to a first embodiment of the invention.

Figure 1:
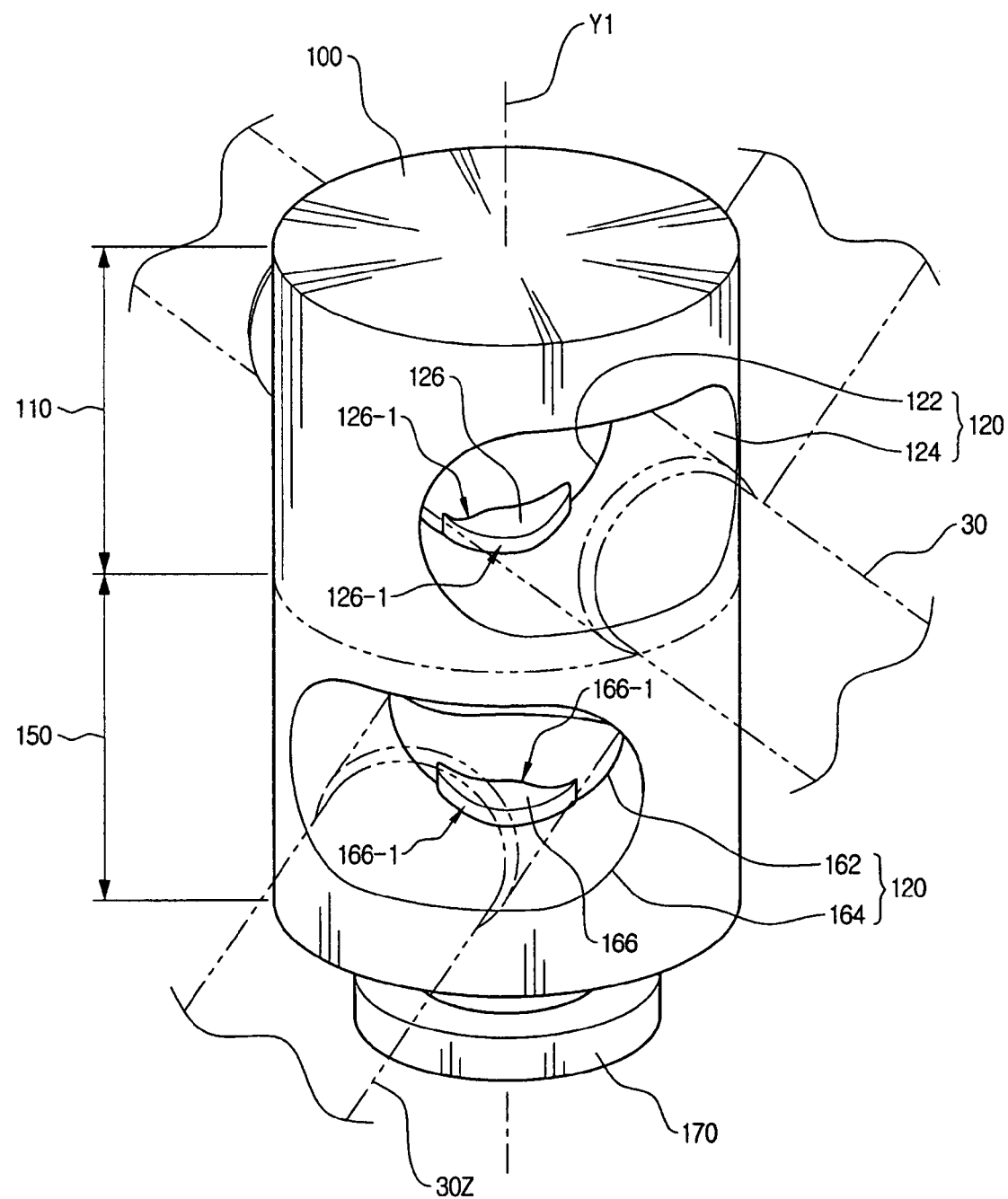
FIG. 1 is a perspective view of a connector for tent poles according to a first embodiment of the invention.
Figure 2:
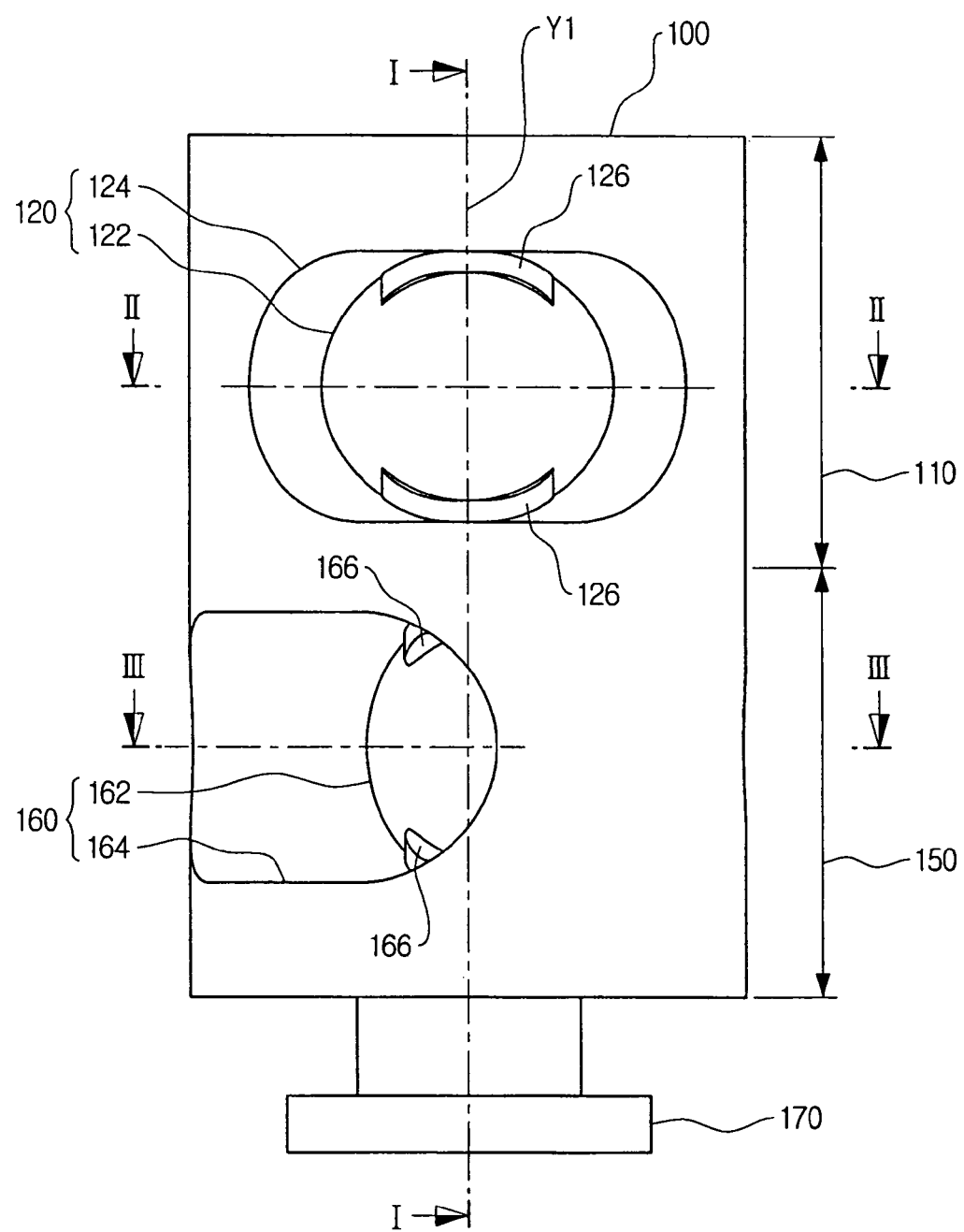
FIG. 2 is a front view of a connector for tent poles according to the first embodiment of the invention.
Figure 3:
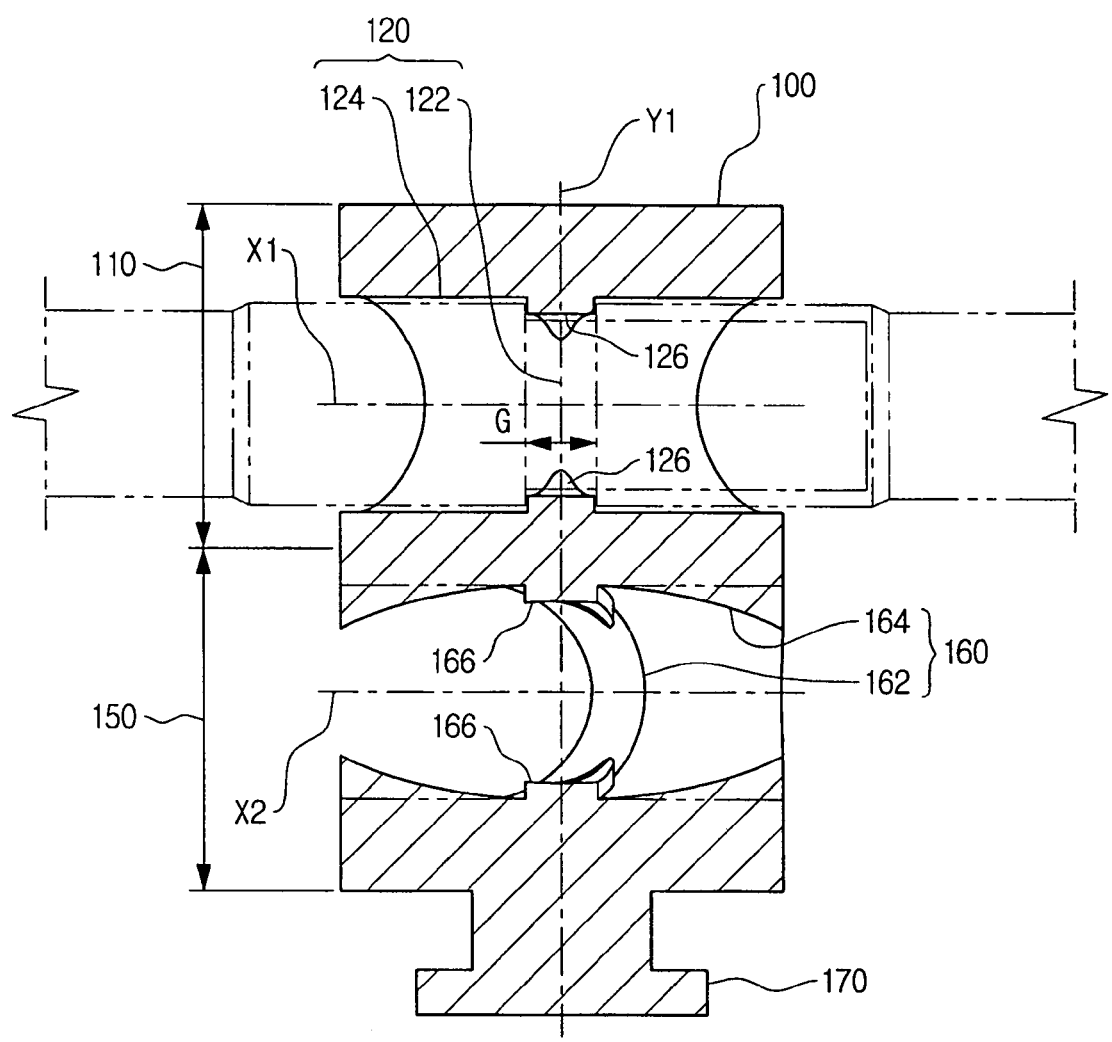
FIG. 3 is a sectional view taken along a line I-I of FIG. 2.

As shown in FIGS. 1 to 3, a connector for tent poles according to a first embodiment of the invention consists of a body 100 of a single piece. An approximate half part (upper half part in the drawings) of the body 100 constitutes a first connection part 110 and the other approximate half part (lower half part in the drawings) constitutes a second connection part 150. The first connection part 110 is provided so that a pole assembly 30 passes through and is connected thereto. The second connection part 150 is provided so that another pole assembly or a clip is connected thereto.

The first connection part 110 is formed with a pivot hole 120 for connecting the pole assembly 30. The pivot hole 120 is formed into a hole shape so that the pole assembly 30 can pass through and swivel therein by a predetermined angle.

Figure 4:
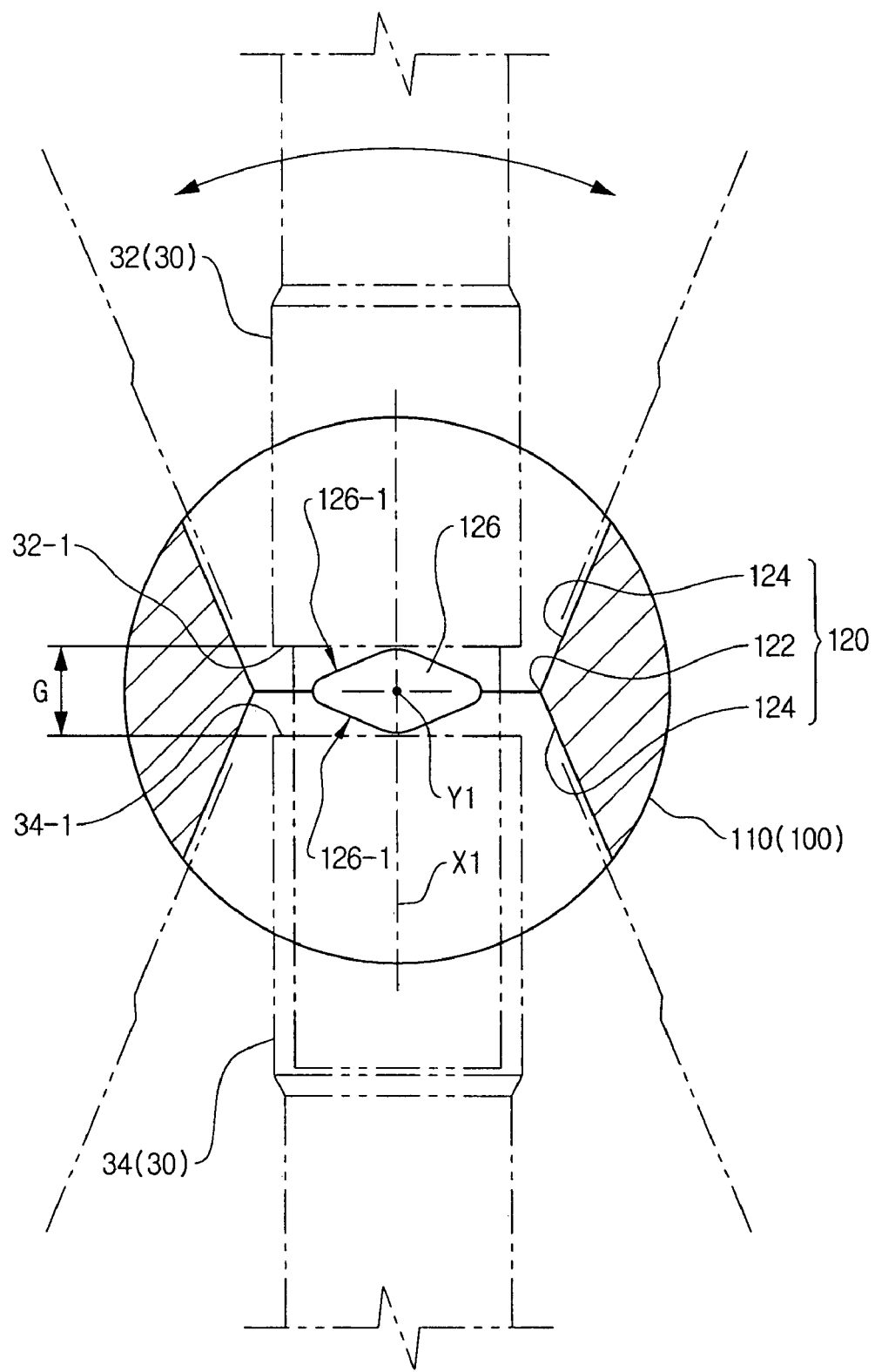
FIG. 4 is a sectional view taken along a line II-II of FIG. 2.

Specifically, as shown in FIGS. 3 and 4, the pivot hole 120 consists of a base hole 122 and an expansion hole 124. The base hole 122 is formed through the first connection part in a direction traversing a longitudinal axis Y1 of the body 100 and has a size (size enabling the pole assembly to pass through, loosely a little) corresponding to an outer diameter of the pole assembly 30 at a central point of a cross section of the first connection part 110. The base hole 122 is a swivel center of the pole assembly 30. The expansion hole 124 are widely expanded in a radially outward direction of the body 100 from both front and rear sides of the base hole 122 so as to correspond to a swiveling trajectory of the pole assembly 30 so that the pole assembly 30 can swivel by a predetermined (pre-designed) angle on any plane (a plane intersecting the longitudinal axis Y1 in the drawings) intersecting the longitudinal axis Y1 of the body 100, around the base hole 122 of a swivel center. In the drawings, it is shown that the swiveling plane of the pole assembly 30 is orthogonal to the longitudinal plane Y1. However, it is not necessarily required that the swiveling plane of the pole assembly 30 is orthogonal to the longitudinal axis Y1. In other words, any plane may be set which is suitable for the requirements of the tent.

Figure 6:
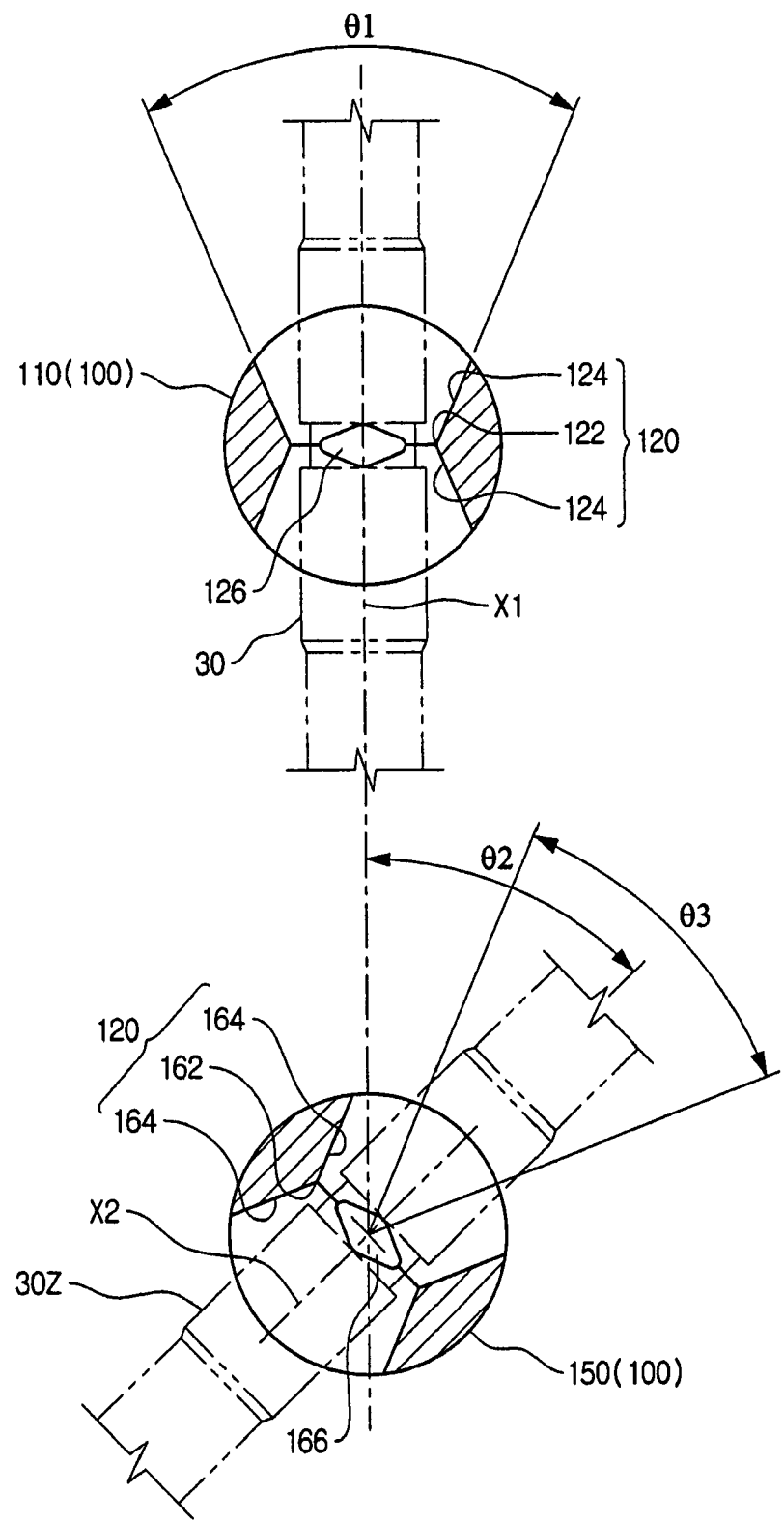
FIG. 6 shows an intersecting angle of pole assemblies connected to a first connection part and a second connection part of a connector for tent poles according to the first embodiment of the invention.

At two points in the base hole 122, it is formed two pivot protrusions 126 opposite to each other. The pivot protrusions 126 serve as a pivot point combining the swiveling and position-fixing functions of the pole assembly 30. In other words, the pivot protrusions 126 serve as a 'stopper' for preventing movement of the pole assembly 30 as well as a 'swivel center point' of the pole assembly 30. The pole assembly 30, as shown in FIG. 6, forms such a structure that plural male poles 32 and female poles 34 are sequentially fitted. The pivot protrusions 126 are fitted into a gap G between an end face 32-1 of the male pole 32 and an end face 34-1 of the female pole 34 of the pole assembly 30. At both sides of the pivot protrusions 126, it is formed a cam surface 126-1 following a swiveling trajectory delineated by the two end faces 32-1, 34-1 of the pole assembly 30. The cam surface 126-1 guides the end faces 32-1, 34-1 of the male pole 32 and the female pole 34 to contact each other and to smoothly swivel.

Figure 5:
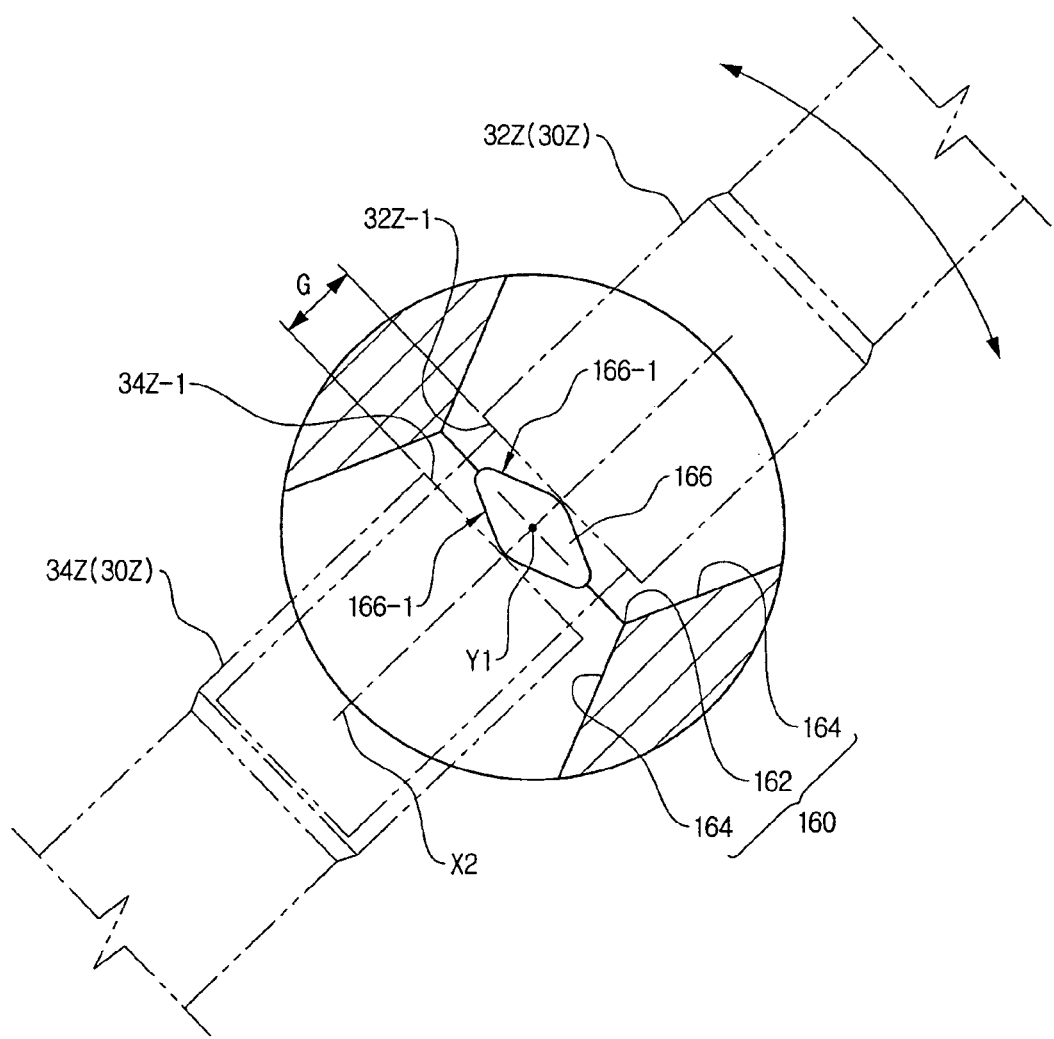
FIG. 5 is a sectional view taken along a line III-III of FIG. 2.

The second connection part 150 is a part to which another pole assembly or clip is connected. As shown in FIGS. 1 to 3, in order to connect another pole assembly 30Z, the second connection part 150 is preferably provided with a pivot hole 160 and pivot protrusions 166 same as the pivot hole 120 and the pivot protrusions 126 of the first connection part 110. Accordingly, as shown in FIG. 5, the pivot hole 160 and the pivot protrusions 166 of the second connection part 150 have the same base hole 162, expansion hole 164 and cam surface 166-1 as those of the pivot hole 120 and the pivot protrusions 126 of the first connection part 110. Like this, when both the first connection part 110 and the second connection part 150 have the pivot holes 120, 160 and the pivot protrusions 126, 166, it is possible to swivel the two pole assemblies 30, 30Z. Therefore, it is possible to set an intersecting angle between the two pole assemblies 30, 30Z within a very broad range.

In addition, as shown in Figs., the penetration direction of the pivot hole 120 of the first connection part 110 may be different from that of the pivot hole 160 of the second connection part 150. In other words, the penetration directions of the pivot hole 120 and the pivot hole 160 may cross each other. Therefore, it is possible to select an intersecting angle of the two pole assemblies within a broader angle range.

Figure 7:
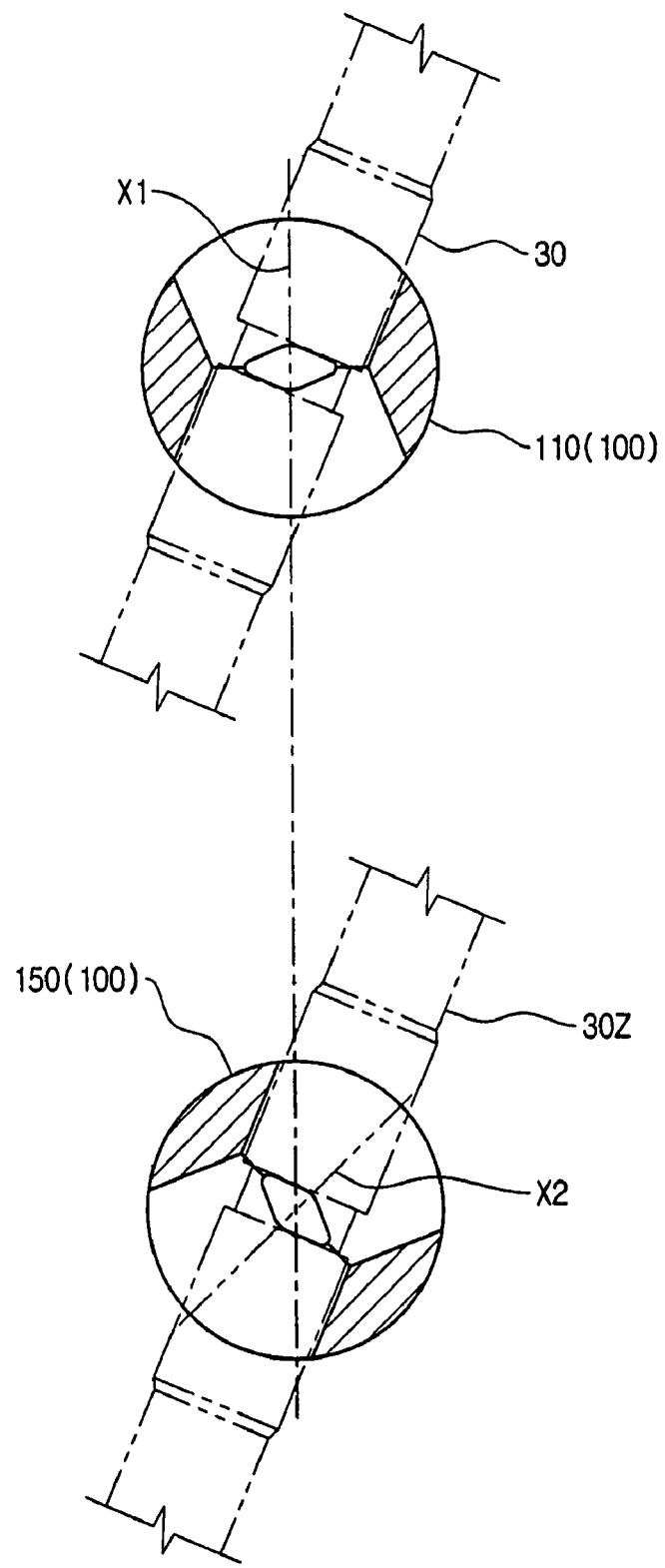
FIG. 7 shows an intersecting angle of pole assemblies connected to a first connection part and a second connection part of a connector for tent poles according to the first embodiment of the invention.
Figure 8:
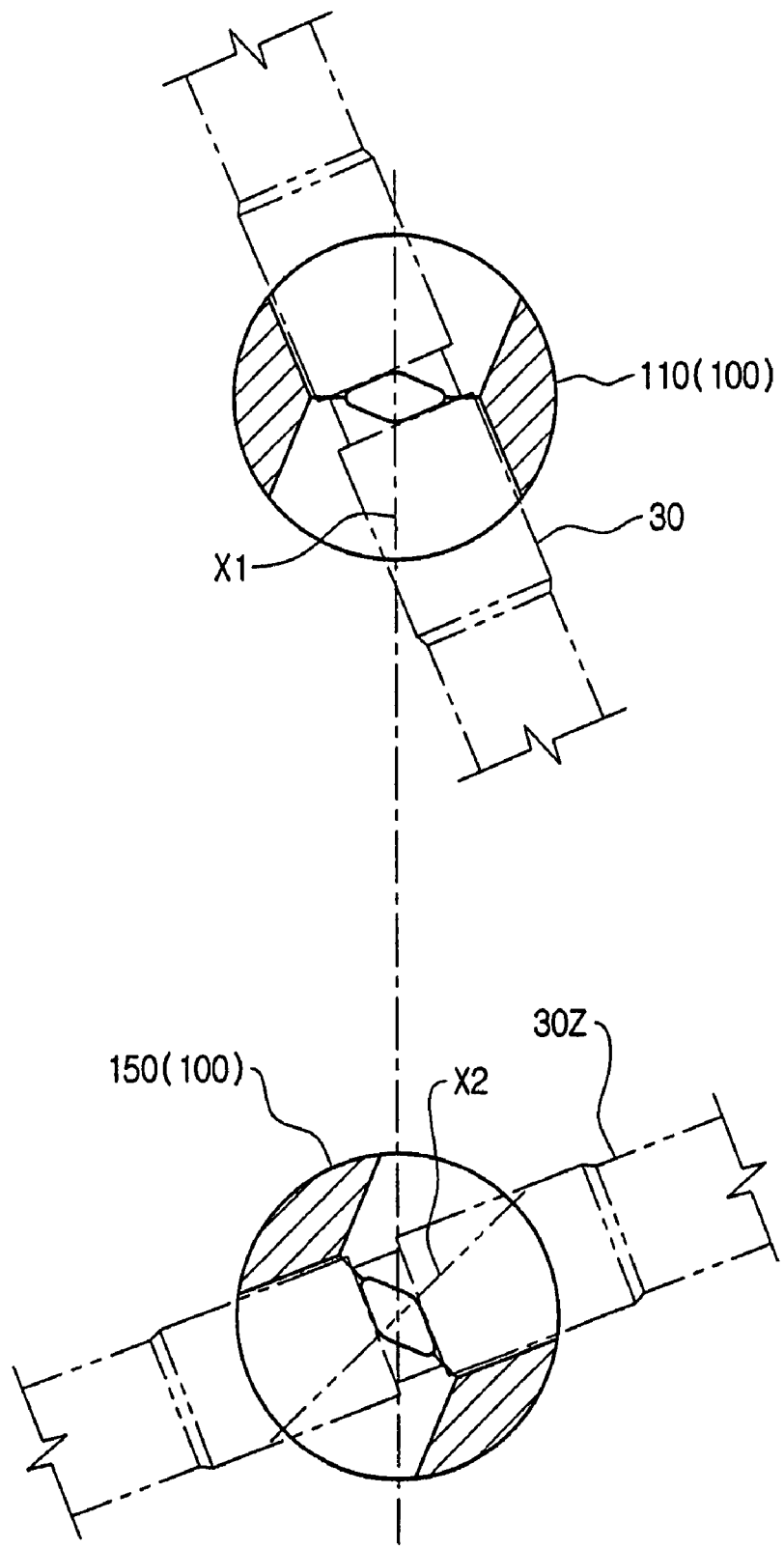
FIG. 8 shows an intersecting angle of pole assemblies connected to a first connection part and a second connection part of a connector for tent poles according to the first embodiment of the invention.

In FIGS. 6 to 8, when the male poles 32, 32Z and the female poles 34, 34Z of the respective pole assemblies 30, 30Z are inserted from both sides of the expansion holes 124, 164, the pivot protrusions 126 are fitted in the gap G between the end faces 32-1, 32Z-1 of the male poles 34, 34Z and the end faces 34-1, 34Z-1 of the female poles 34, 34Z. As such, the pole assemblies 30, 30Z can swivel around the pivot protrusions 126. In addition, the pole assemblies 30, 30Z are prevented from being arbitrarily moved in a longitudinal direction thereof due to the stopper function of the pivot protrusions 126.

In the mean time, as described later in the other embodiments, the second connection part 150 may be provided with a through-hole having a straight shape that just enables the pole assembly 30Z to pass through instead of the above described pivot hole 160. According to this structure, it is possible to swivel the pole assembly 30 of the two pole assemblies 30, 30Z, which is connected to the first connection part 110.

In addition, when the second connection part 150 has the pivot hole 160 as described above or the through-hole, an end of the second connection part 150 may be further extended to form a clip connection part 170 (refer to FIGS. 1 to 3). To the clip connection part 170 is connected a conventional clip.

Furthermore, the second connection part 150 may consist of the clip connection part 170 for connecting a clip without the pivot hole 160 or through-hole.

FIGS. 6 to 8 show various connected states of the pole assemblies to the connector for tent poles. The sections taken along lines II-II and III-III in FIG. 2 are shown in a single drawing. The descriptions are focused on a change in the intersecting angles between the pole assemblies 30, 30Z connected to the pivot holes when all the first connection part 110 and the second connection part 150 are formed with the pivot holes 120, 160. It should be again noted that the penetration directions of the pivot holes 120, 160 may be different from the example shown in the drawings.

As shown in FIG. 6, the pole assembly 30 connected to the first connection part 110 can swivel within an angel range of θ1 around a central line X1 of the pivot hole 120. The pole assembly 30Z connected to the second connection part 150 can swivel within an angle range of θ3 around a central line X2 of the pivot hole 160 while the central line X2 crosses the central line X1 of the pivot hole 120 of the first connection part 110 in an angle of θ2. As shown in FIG. 6, when the pole assembly 30 of the first connection part 110 and the pole assembly 30Z of the second connection part 150 maintain the states corresponding to the central lines X1, X2 without swiveling in any direction, the pole assembly 30 and the pole assembly 30Z cross each other in the angle of θ2.

In FIG. 7, when the pole assembly 30 of the first connection part 110 swivels in a clockwise direction to the utmost and the pole assembly 30Z of the second connection part 150 swivels in a counterclockwise direction to the utmost, the pole assembly 30 and the pole assembly 30Z become parallel to each other without intersecting.

In FIG. 8, when the pole assembly 30 of the first connection part 110 swivels in a counterclockwise direction to the utmost and the pole assembly 30Z of the second connection part 150 swivels in a clockwise direction to the utmost, the pole assembly 30 and the pole assembly 30Z form the largest intersecting angle.

In the mean time, in the connector for tent poles shown in FIGS. 1 to 8, the body 100 is shaped into a single cylinder. Therefore, the pivot holes 120, 160 are formed at two points of the longitudinal direction Y1 of the body 100 while traversing the longitudinal axis Y1. The body 100 as described above is suitable for a metal connector. The pivot holes 120, 160 can be formed with a die casting.

Like this, according to the invention, since the tent poles can swivel rather than the connector, it is possible to structure the connector for tent poles into a single body and to provide the various intersecting angles to the tent poles.

Embodiment 2

FIGS. 9 to 12 show a connector for tent poles according to a second embodiment of the invention.

Figure 9:
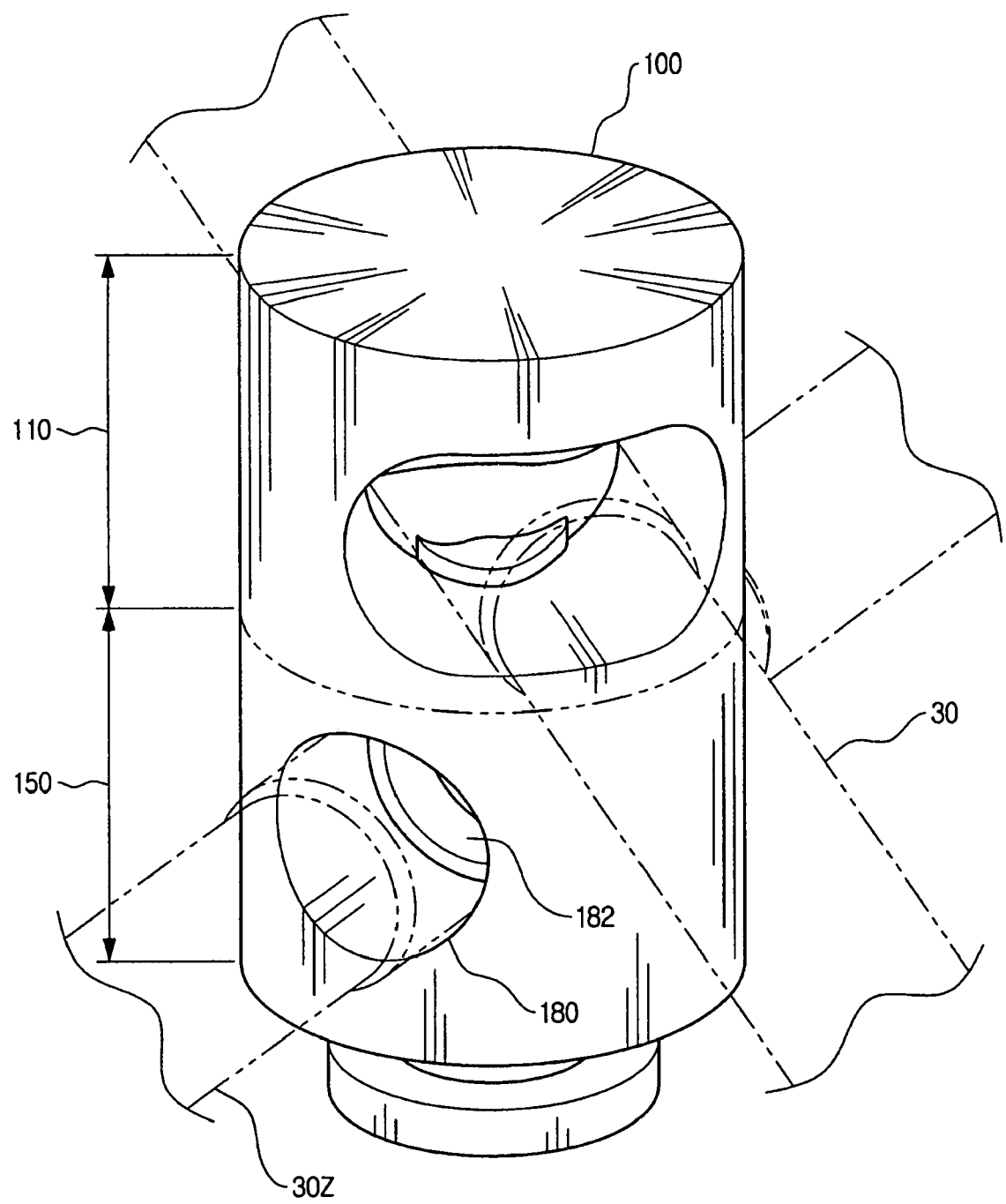
FIG. 9 is a perspective view of a connector for tent poles according to a second embodiment of the invention.
Figure 10:
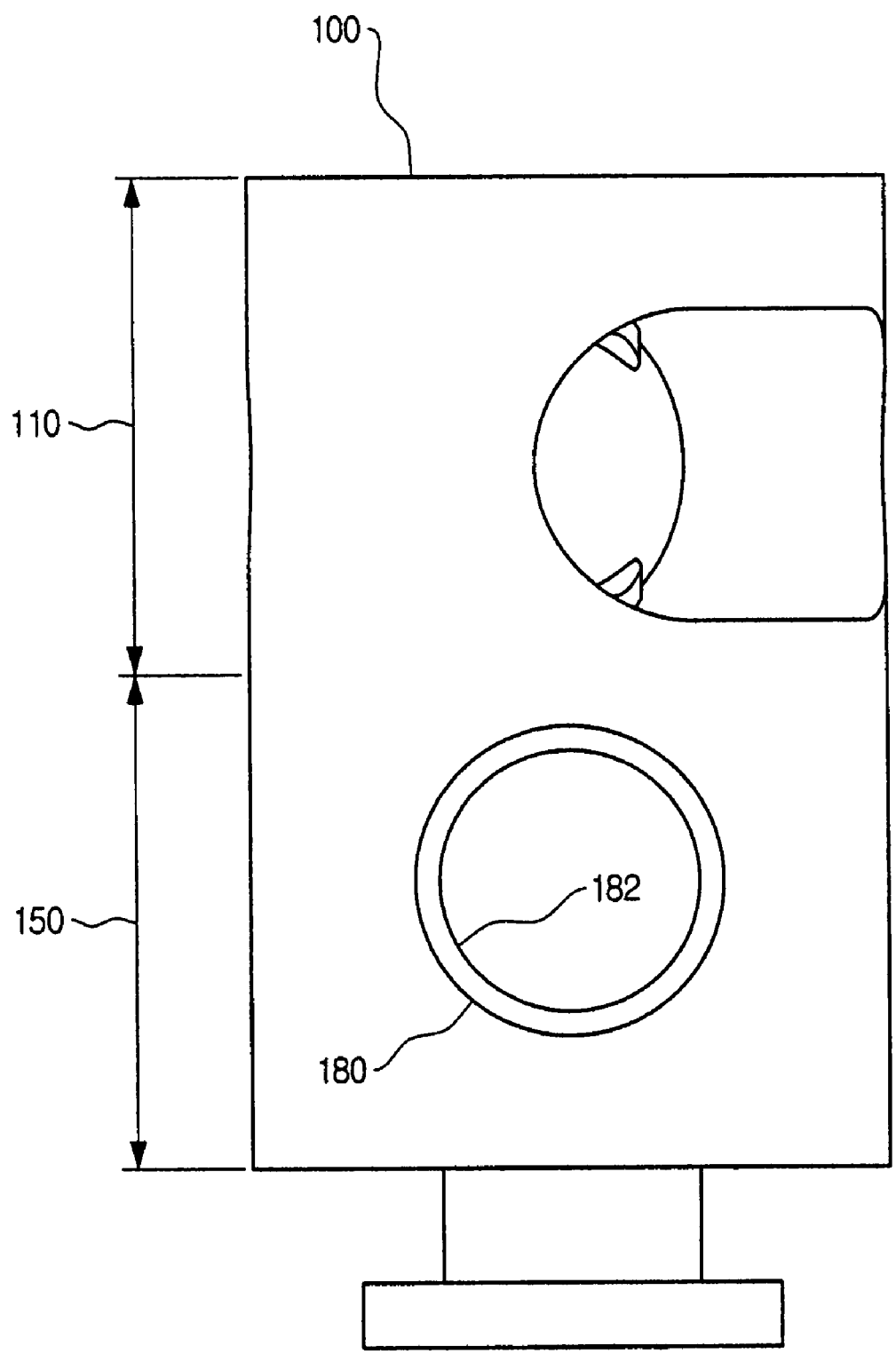
FIG. 10 is a front view of a connector for tent poles according to the second embodiment of the invention.

As shown in FIGS. 9 and 10, the connector for tent poles according to this embodiment comprises the second connection part 150 that includes a through-hole 180 having a straight shape through which a pole assembly can pass, instead of the pivot hole 160. Since the other structures are same as the first embodiment, the descriptions thereof are omitted.

According to the above structure, it is possible to swivel only the pole assembly 30 of the two pole assemblies 30, 30Z, which is connected to the first connection part 110. The pole assembly 30Z can pass through the through-hole 180 of the second connection part 150 but cannot swivel therein.

Figure 11:
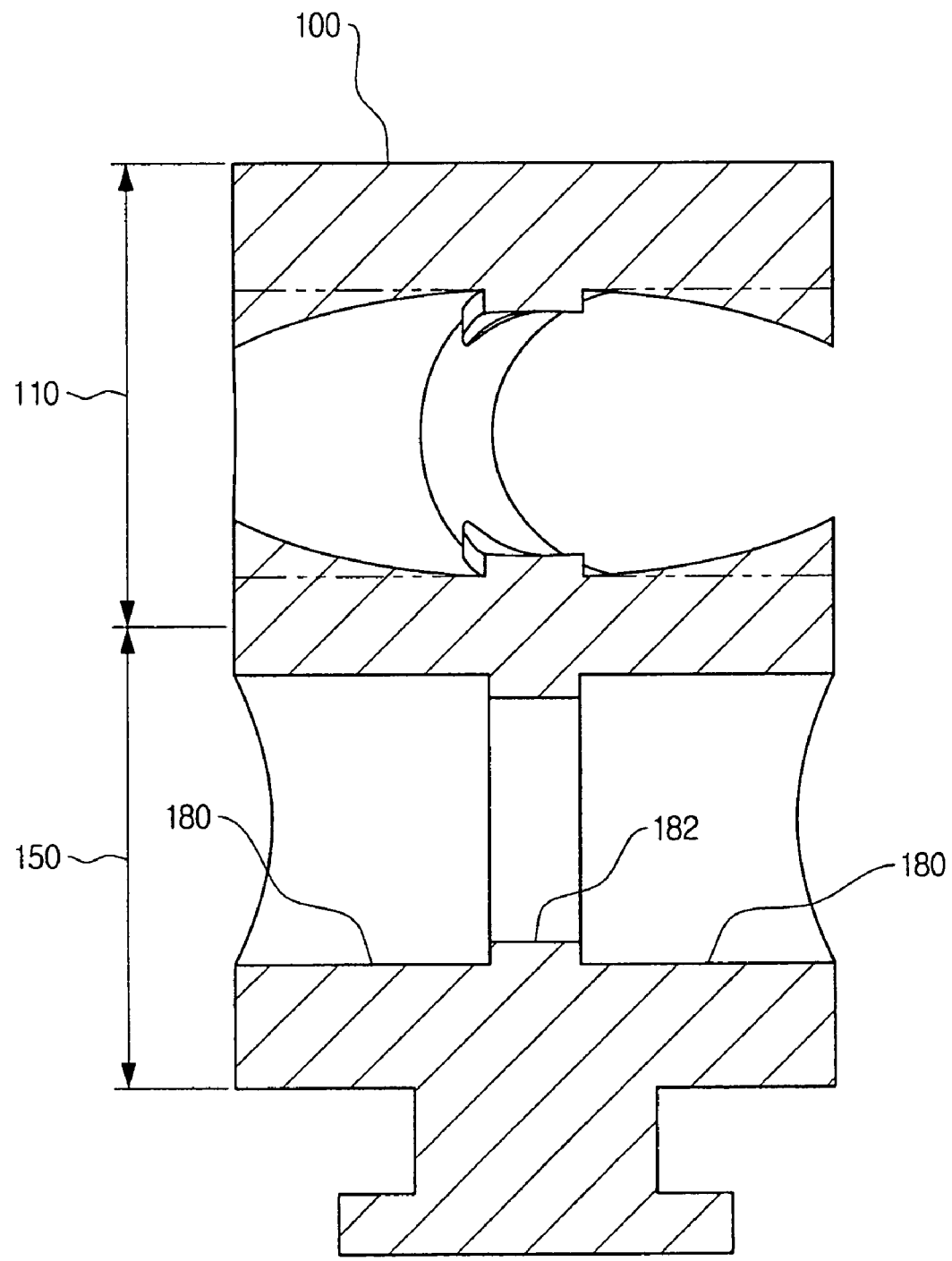
FIG. 11 is a sectional view taken along a line IV-IV of FIG. 10.
Figure 12:
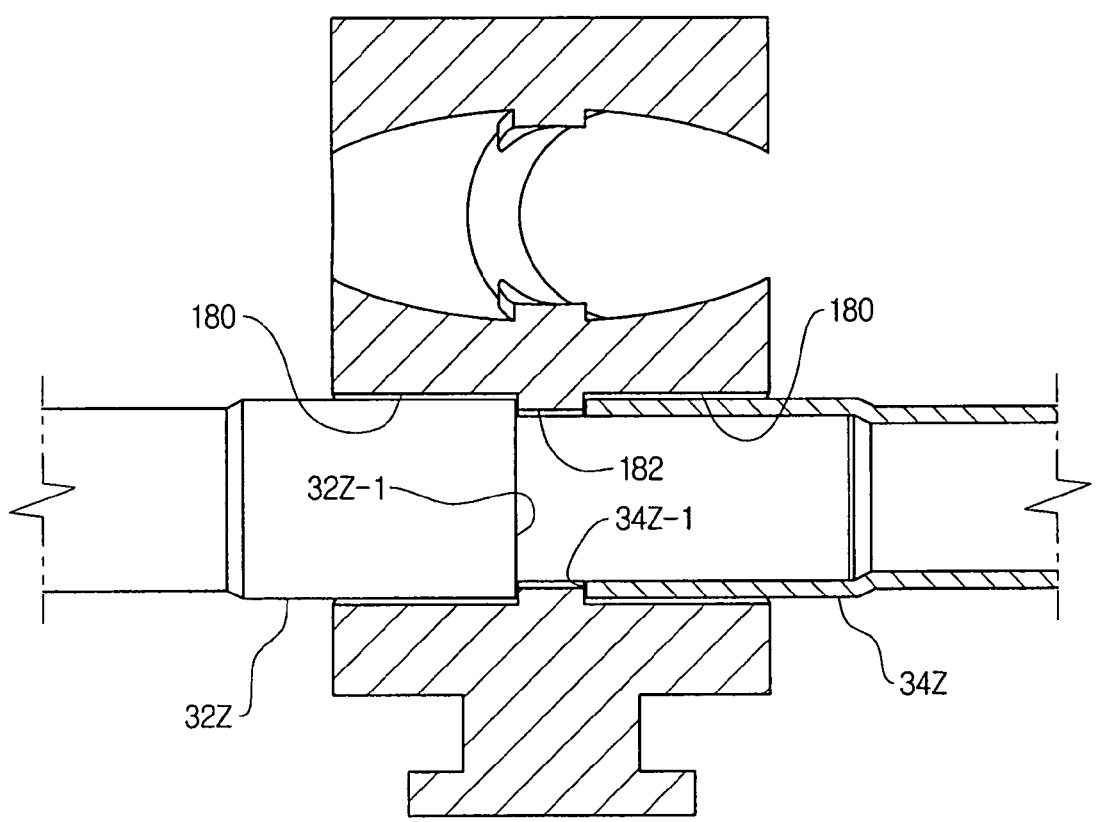
FIG. 12 is a sectional view showing a connected state of a pole assembly in FIG. 11.
Figure 13:
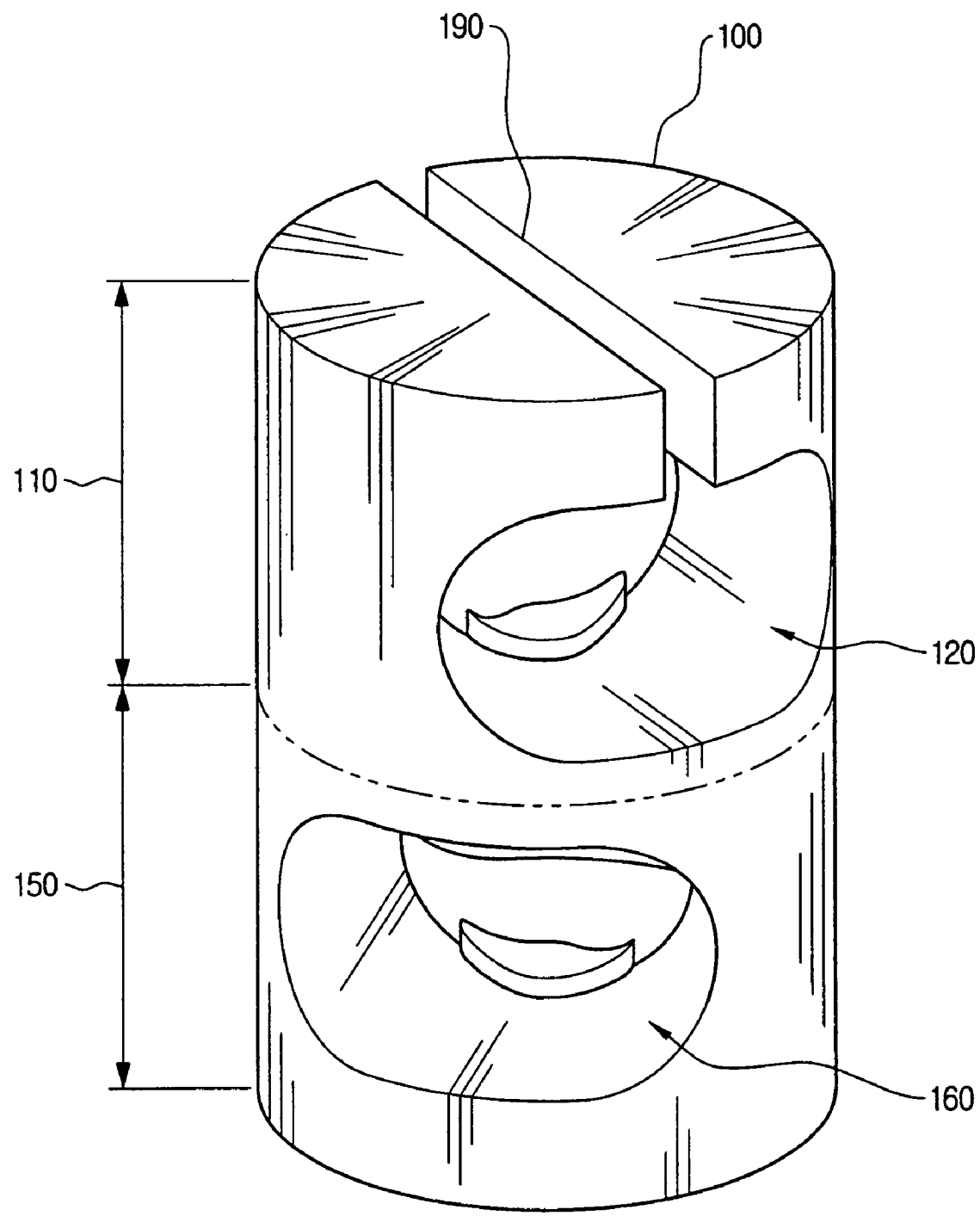
FIG. 13 is a perspective view of a connector for tent poles according to a third embodiment of the invention.

As shown in FIGS. 11 and 12, it is preferable to form stop protrusions 182 at an inner periphery of a longitudinal center part of the through-hole 180 of the second connection part 150. The stop protrusions 182 are fitted in the gap G between the end face 32Z-1 of the male pole 32 and the end face 34Z-1 of the female pole 34, thereby blocking longitudinal movements (sliding) of the male pole 32Z and the female pole 34Z.

Embodiment 3

FIGS. 13 to 16 show a connector for tent poles according to a third embodiment of the invention. The connector for tent poles according to this embodiment has the same structure as the first and second embodiments, except that an opening 190 is formed and the clip connection part 170 is omitted. Therefore, the descriptions of the structures same as the first and second embodiments are omitted.

At least one of the first connection part 110 and the second connection part 150 is formed with the opening 190. In other words, the opening 190 may be formed at the first connection part 110 only or the second connection part 150 only. Alternatively, the opening may be formed at both the first connection part 110 and the second connection part 150. The opening 190 is provided to easily introduce an elastic string of the pole assembly into the pivot hole 120 of the first connection part 110, or the pivot hole 160 or through-hole 180 of the second connection part 150. Accordingly, the connector of this embodiment is suitable for a pole assembly having a female pole and a male pole connected to each other with an elastic string. In FIGS. 13 to 16, it is shown that the opening 190 is formed at the first connection part 110 only.

Figure 14:
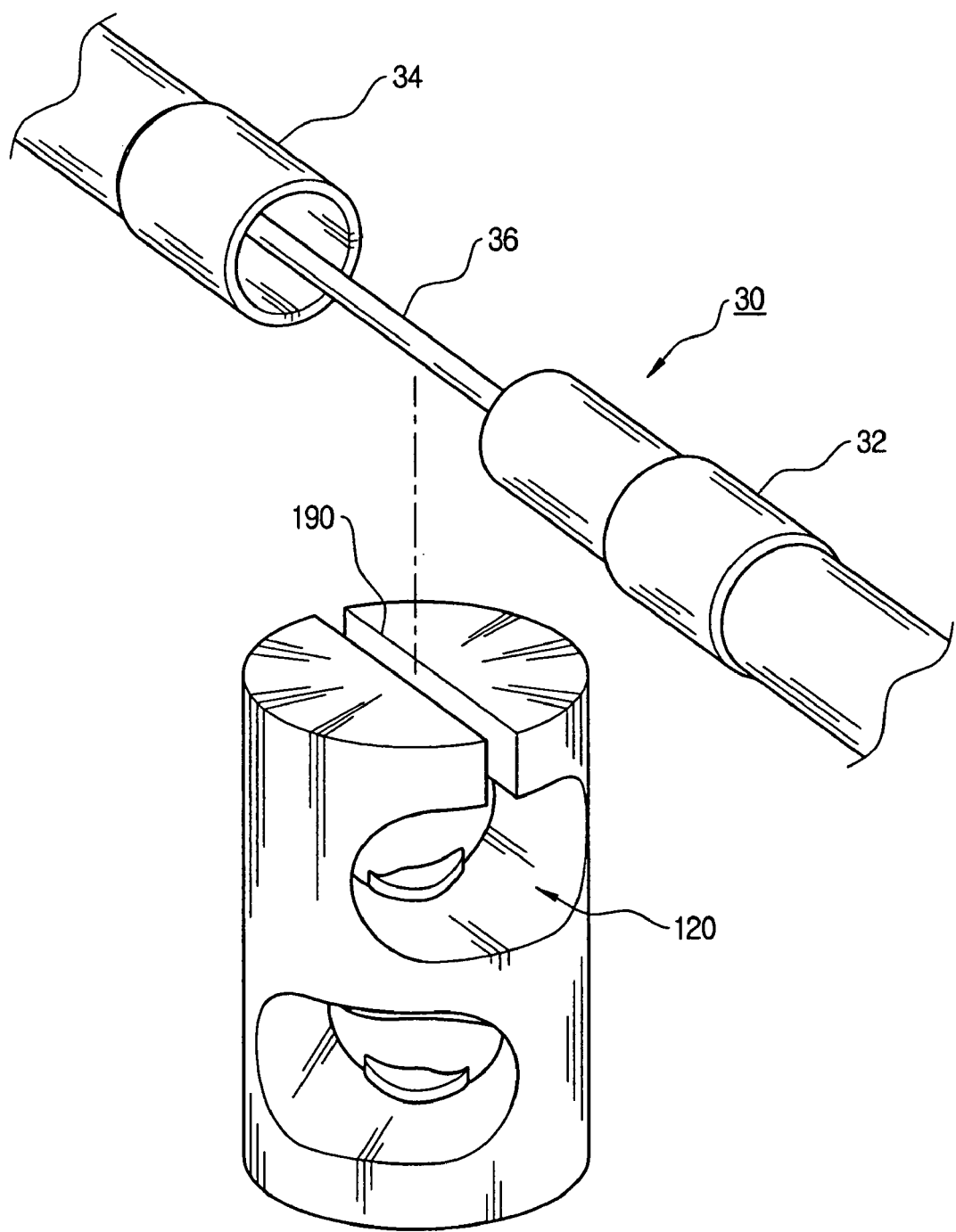
FIG. 14 is a sectional view showing a process of connecting a pole assembly to a connector for tent poles according to the third embodiment of the invention.

A process of connecting the pole assembly 30 having an elastic string to the connector using the opening 190 is as follows: as shown in FIG. 14, the male pole 32 and the female pole 34 of the pole assembly 30 are pulled to disconnect the poles and the exposed elastic string 36 is allowed to pass through the opening 190.

Figure 15:
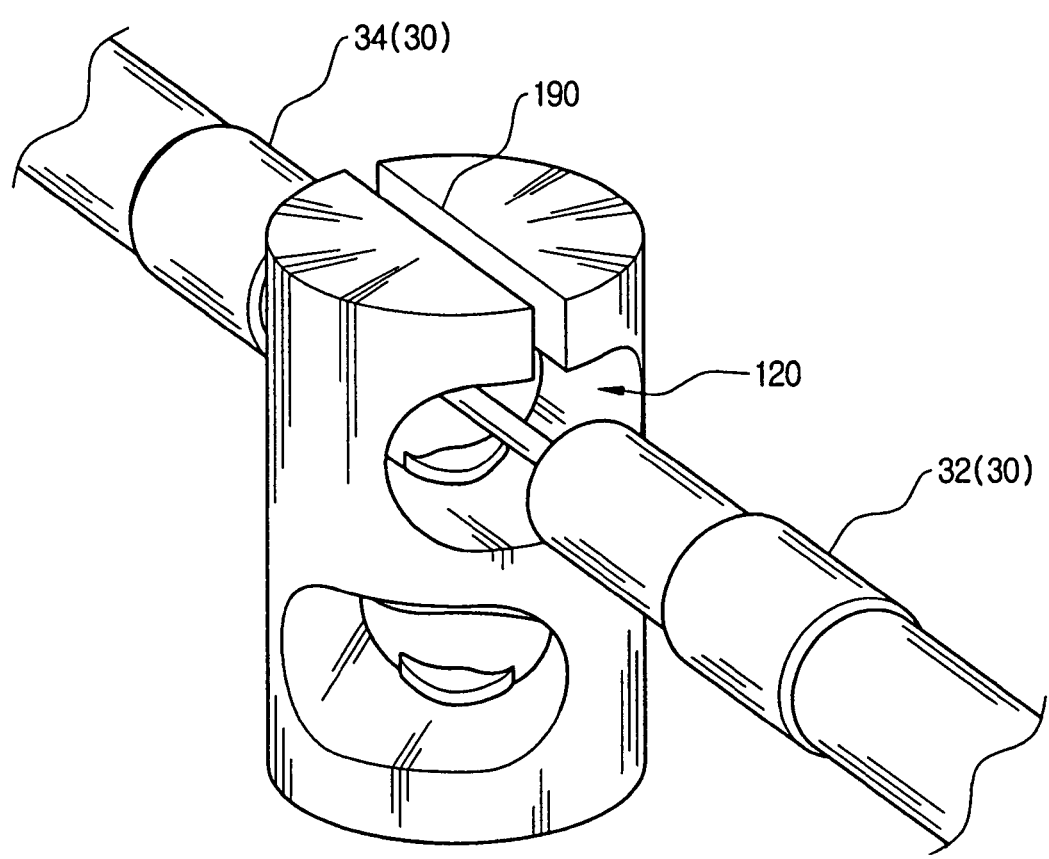
FIG. 15 is a sectional view showing a process of connecting a pole assembly to a connector for tent poles according to the third embodiment of the invention.
Figure 16:
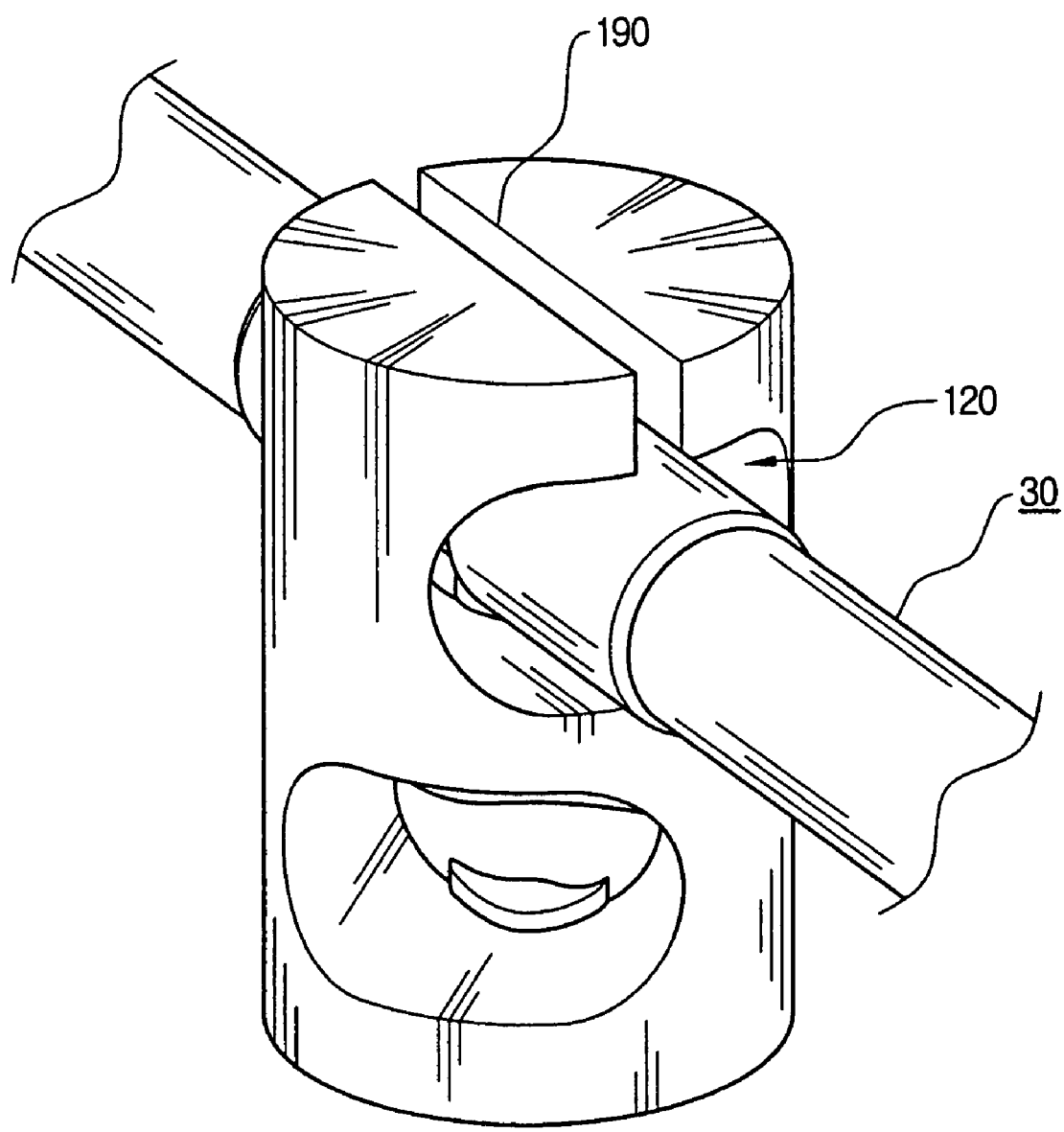
FIG. 16 is a sectional view showing a process of connecting a pole assembly to a connector for tent poles according to the third embodiment of the invention.

Then, as shown in FIG. 15, the elastic string 36 having passed through the opening 190 is introduced into the pivot hole 120. Under such state, when the male pole 32 and the female pole 34 are fitted to each other, the pole assembly 30 is completely connected to the connector, as shown in FIG. 16.

Like this, according to this embodiment, it is possible to easily connect the pole assembly 30 having the elastic string 36 using the opening 190 that communicates with the pivot hole or through-hole.

Embodiment 4

Figure 17:
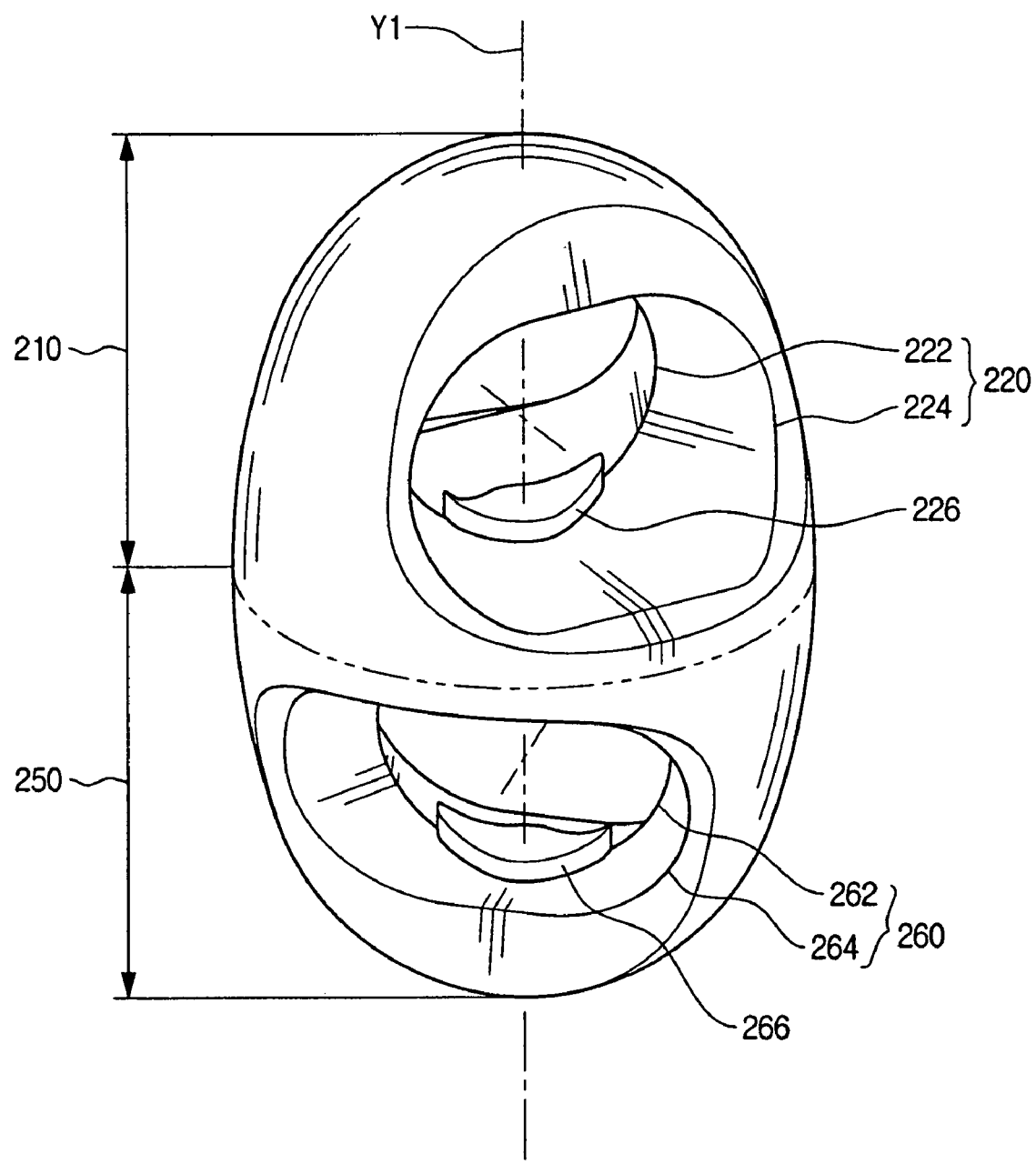
FIG. 17 is a perspective view of a connector for tent poles according to a fourth embodiment of the invention.
Figure 18:
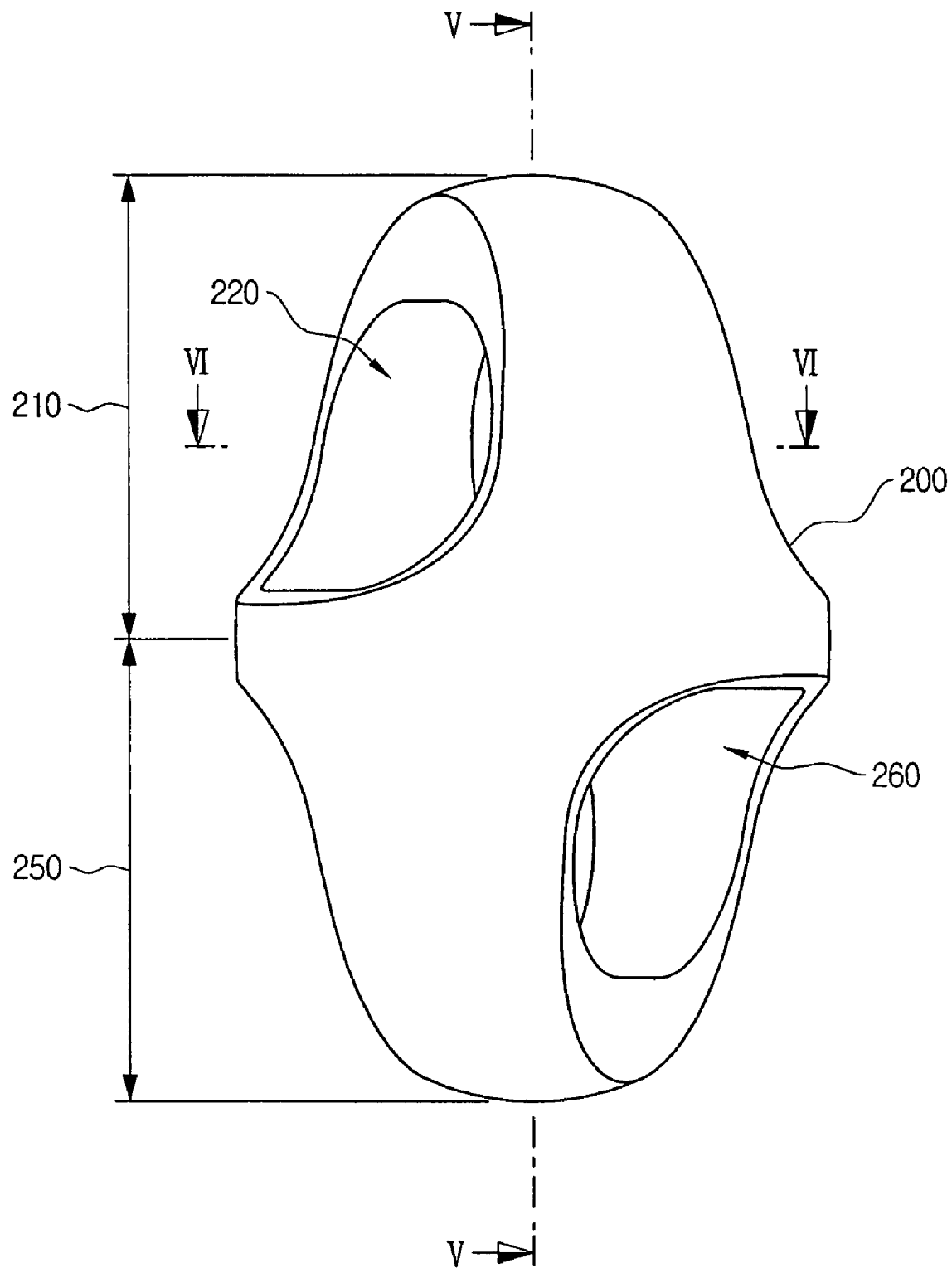
FIG. 18 is a front view of a connector for tent poles according to the fourth embodiment of the invention.

FIGS. 17 to 20 show a connector for tent poles according to a fourth embodiment of the invention. The connector for tent poles according to this embodiment is same as the connectors of the first to third embodiments, except that the first connection part 210 and the second connection part 250 are formed into a ring shape on the whole. In other words, as shown in FIGS. 17 and 18, the first connection part 210 and the second connection part 250 have the pivot holes 220, 260 formed at a center of the body 200, which pass through in a direction traversing the longitudinal axis Y1 of the body, while forming a ring shape at both ends of the body 200.

Figure 19:
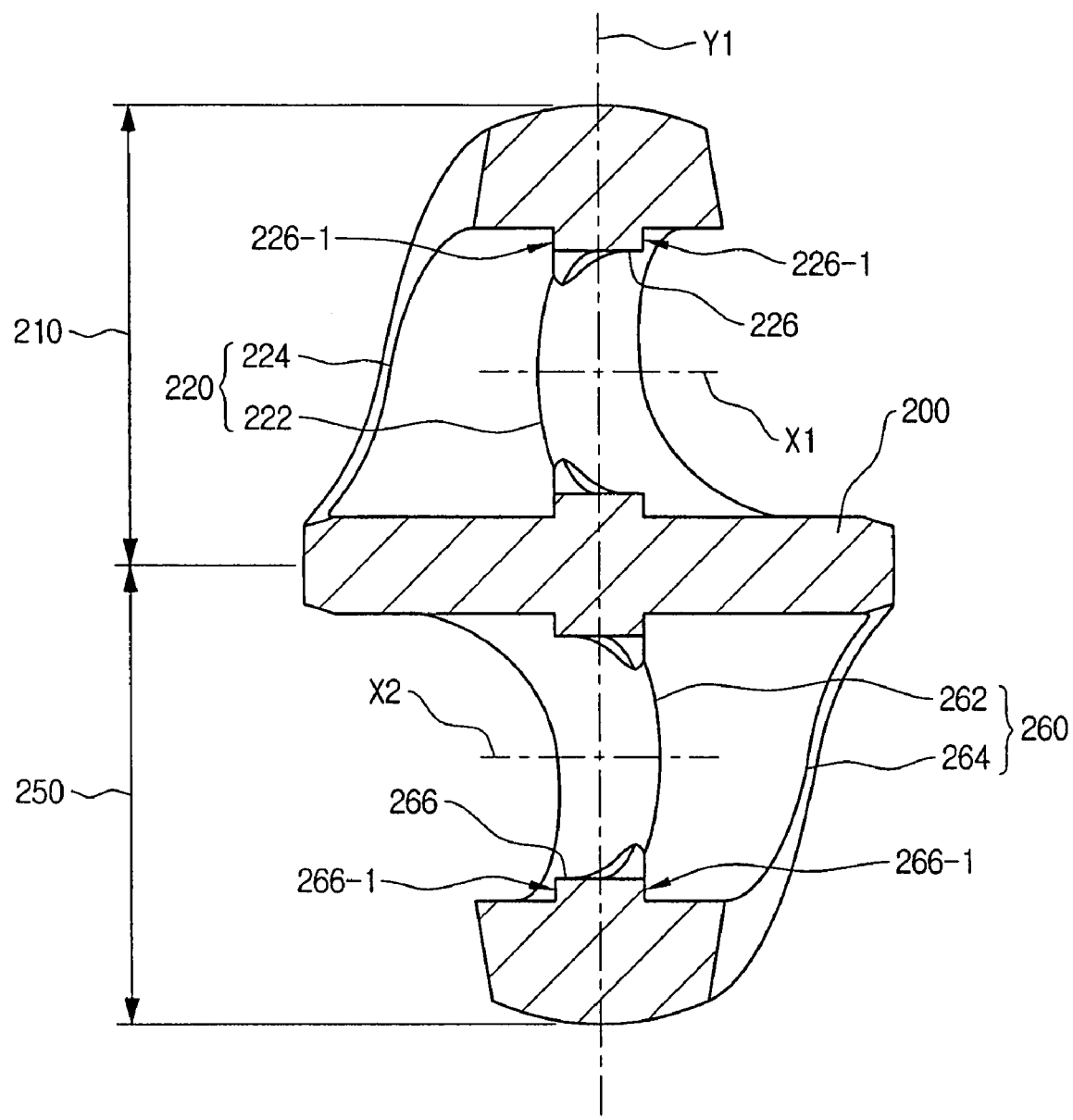
FIG. 19 is a sectional view taken along a line V-V of FIG. 18.
Figure 20:
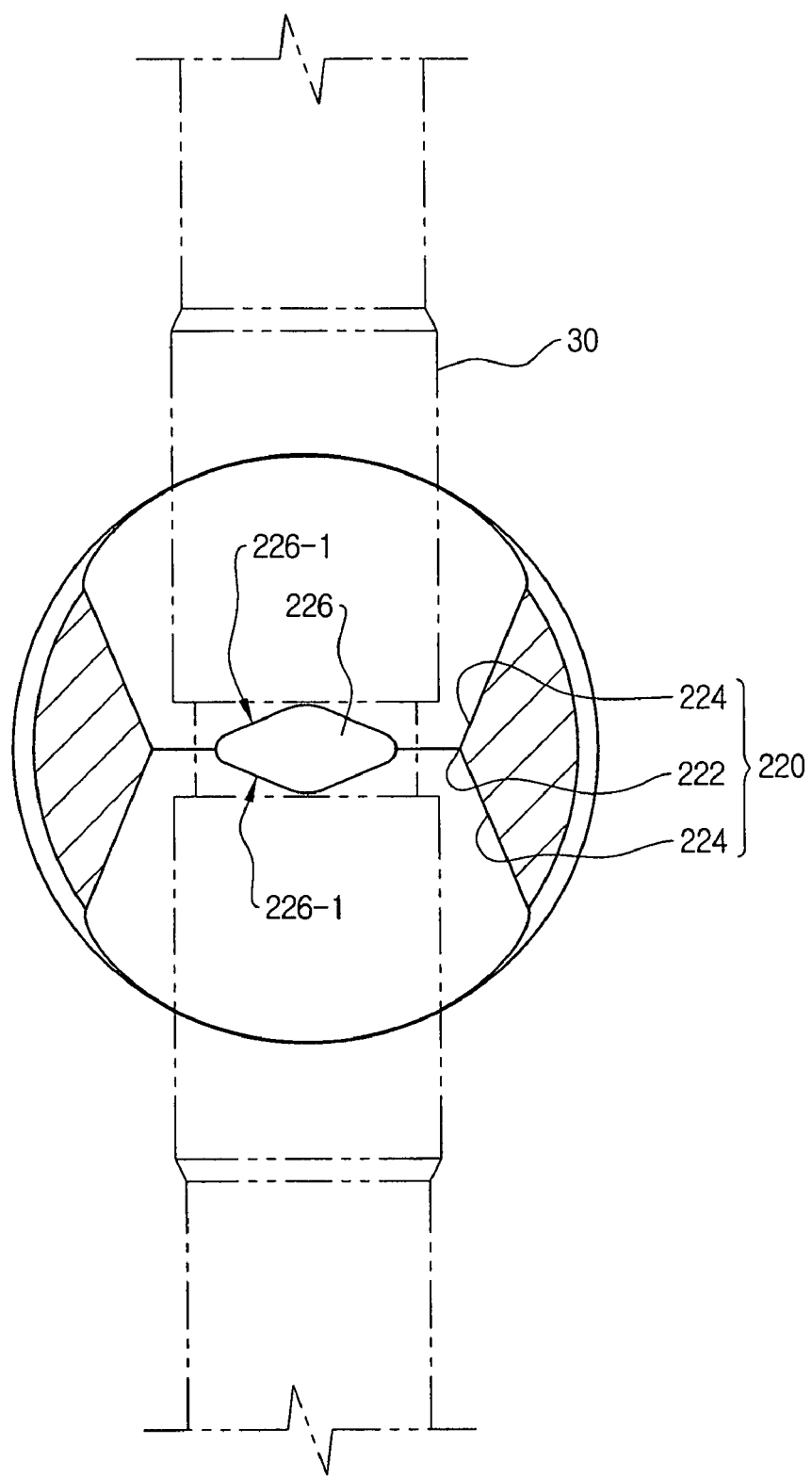
FIG. 20 is a sectional view taken along a line VI-VI of FIG. 18.

The pivot holes 220, 260 are shaped in the same manner as the pivot holes 120, 160 of the first to third embodiments. In other words, as shown in FIGS. 19 and 20, the pivot holes 220, 260 include the base holes 222, 262, the expansion holes 224, 264 and the pivot protrusions 226, 266, which are same as the first embodiment.

Like this, the connector having the connections parts 210, 250 of a ring shape is suitable for a plastic connector. It is possible to easily form the ring shape or pivot hole with a plastic injection molding.

Embodiment 5

FIGS. 21 to 25 show a connector for tent poles according to a fifth embodiment of the invention. The connector of this embodiment is suitable for a connector for connecting an end of the pole assembly 31 for a visor 23 at the P2 point of FIG. 29 to the pole assembly 30 of the tent main body.

Figure 21:
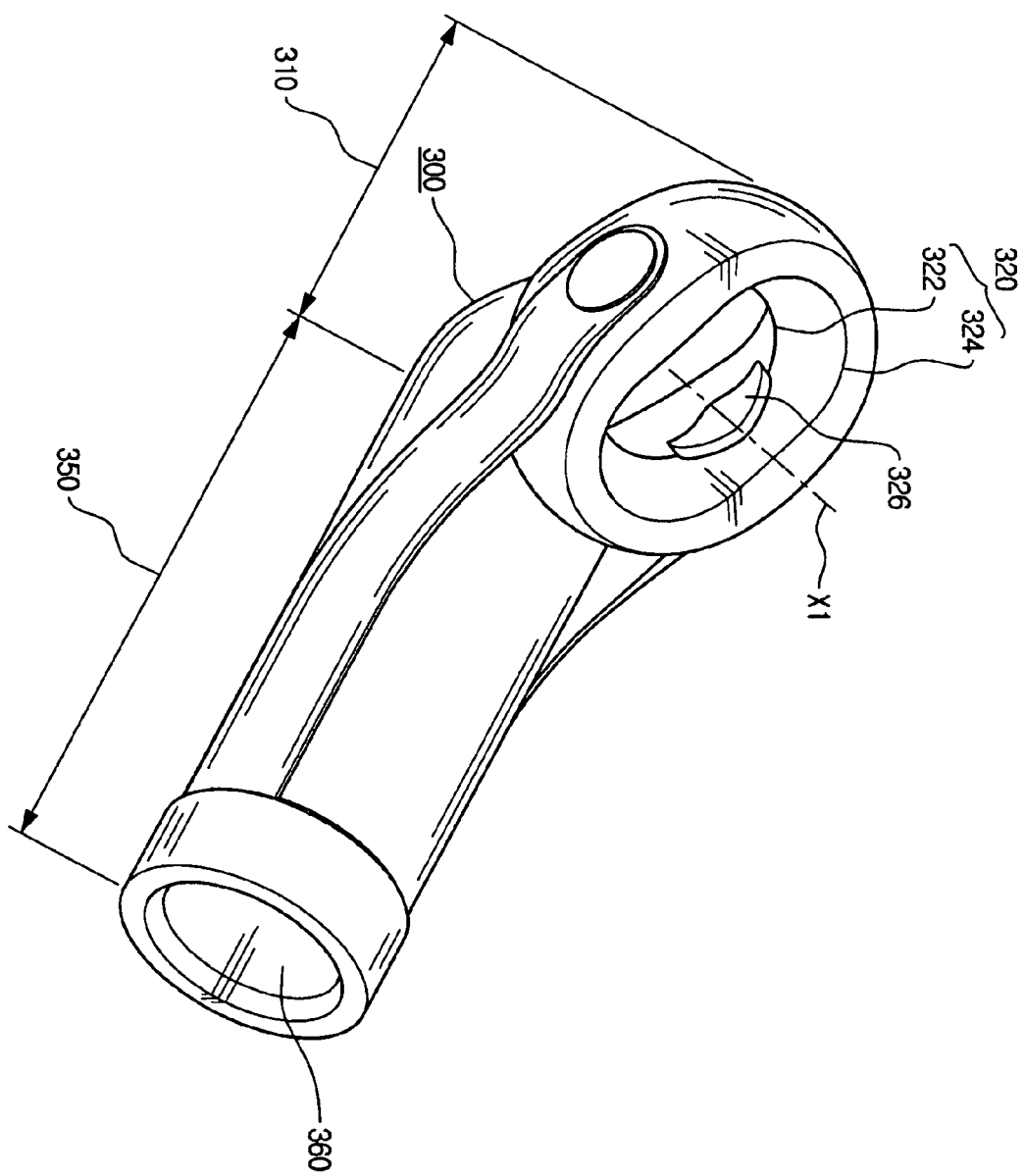
FIG. 21 is a perspective view of a connector for tent poles according to a fifth embodiment of the invention.
Figure 22:
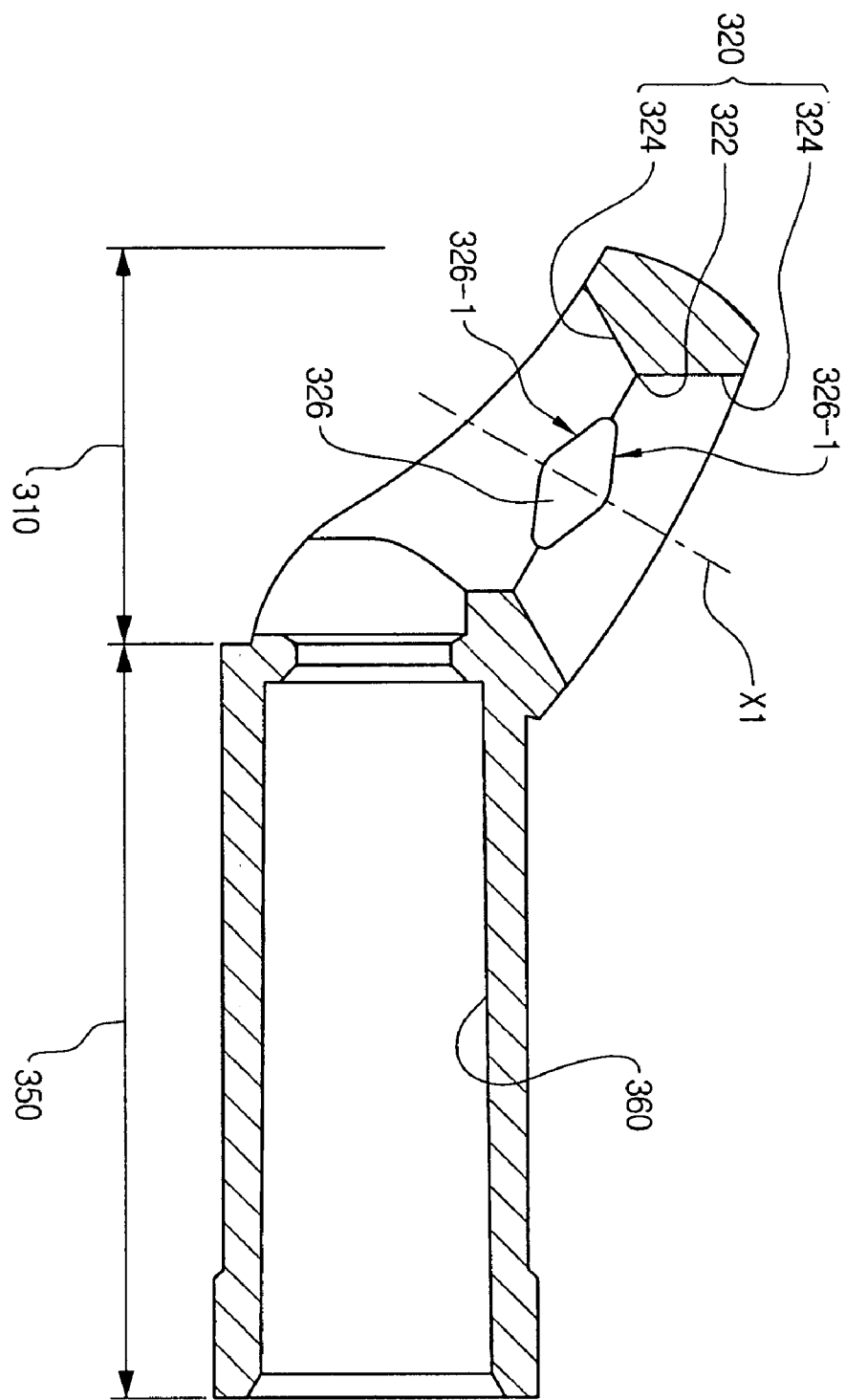
FIG. 22 is a frontal sectional view of a connector for tent poles according to the fifth embodiment of the invention.
Figure 23:
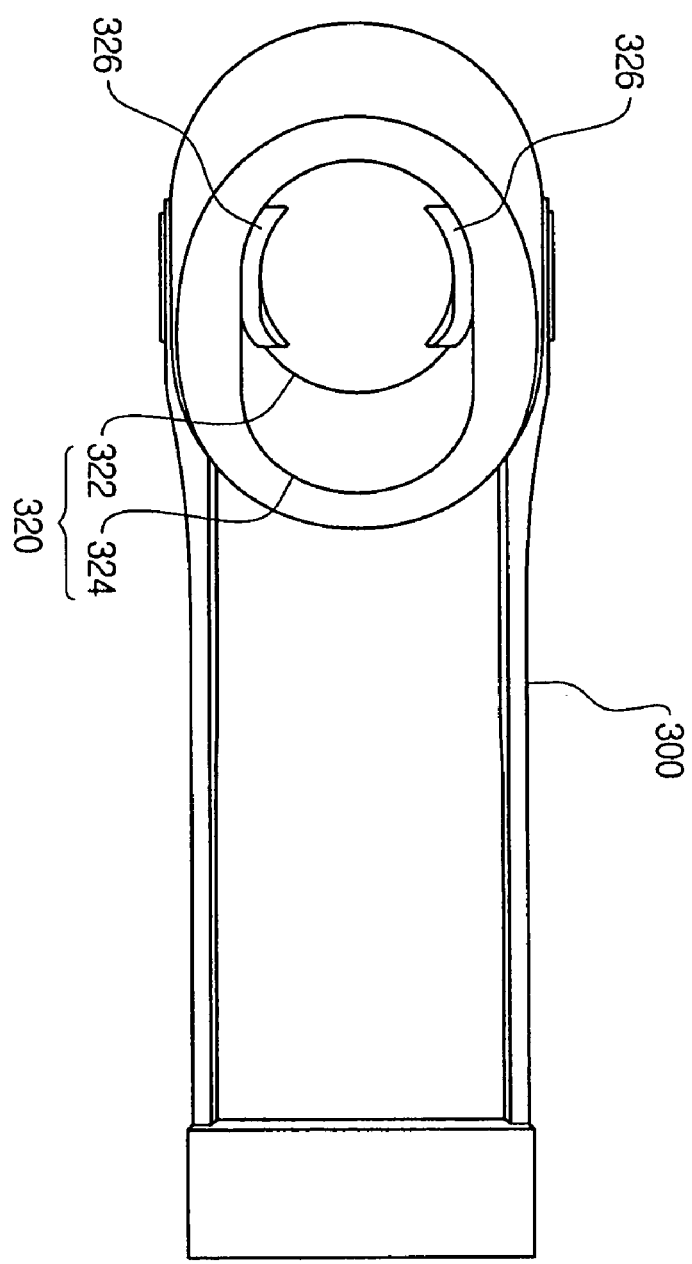
FIG. 23 is a plan view of FIG. 22.

Specifically, the connector of this embodiment comprises, as shown in FIGS. 21 to 23, a body 300 of a single piece consisting of a first connection part 310 and a second connection part 350. The first connection part 310 is provided with a pivot hole 320 and pivot protrusions 326 which are same as the above embodiments, and the second connection part 350 is provided with an insertion recess 360. The second connection part 350 integrally extends from one side of the first connection part 310 while forming a predetermined angle for a central axis X1 of the pivot hole 320 of the first connection part 310. The insertion recess 360 is deepened from an end face of the extended second connection part 350. An end of a pole assembly 31 is inserted into the insertion recess.

The pivot hole 320 is shaped in the same manner as the pivot holes 120, 160, 220, 260 of the first to fourth embodiments. In other words, as shown in FIGS. 21 to 23, the pivot hole 320 includes a base hole 322, an expansion hole 324, pivot protrusions 326 and a cam surface 326-1, which are same as the first to fourth embodiments.

An angle between the first connection part 310 and the second connection part 350, i.e., an intersecting angle of the pivot hole 320 and the insertion recess 360 is set, in consideration of an intersecting angle of the pole assembly 31 for visor relative to the pole assembly of the tent main body and a swiveling range of the pole assembly 31 for visor.

Figure 24:
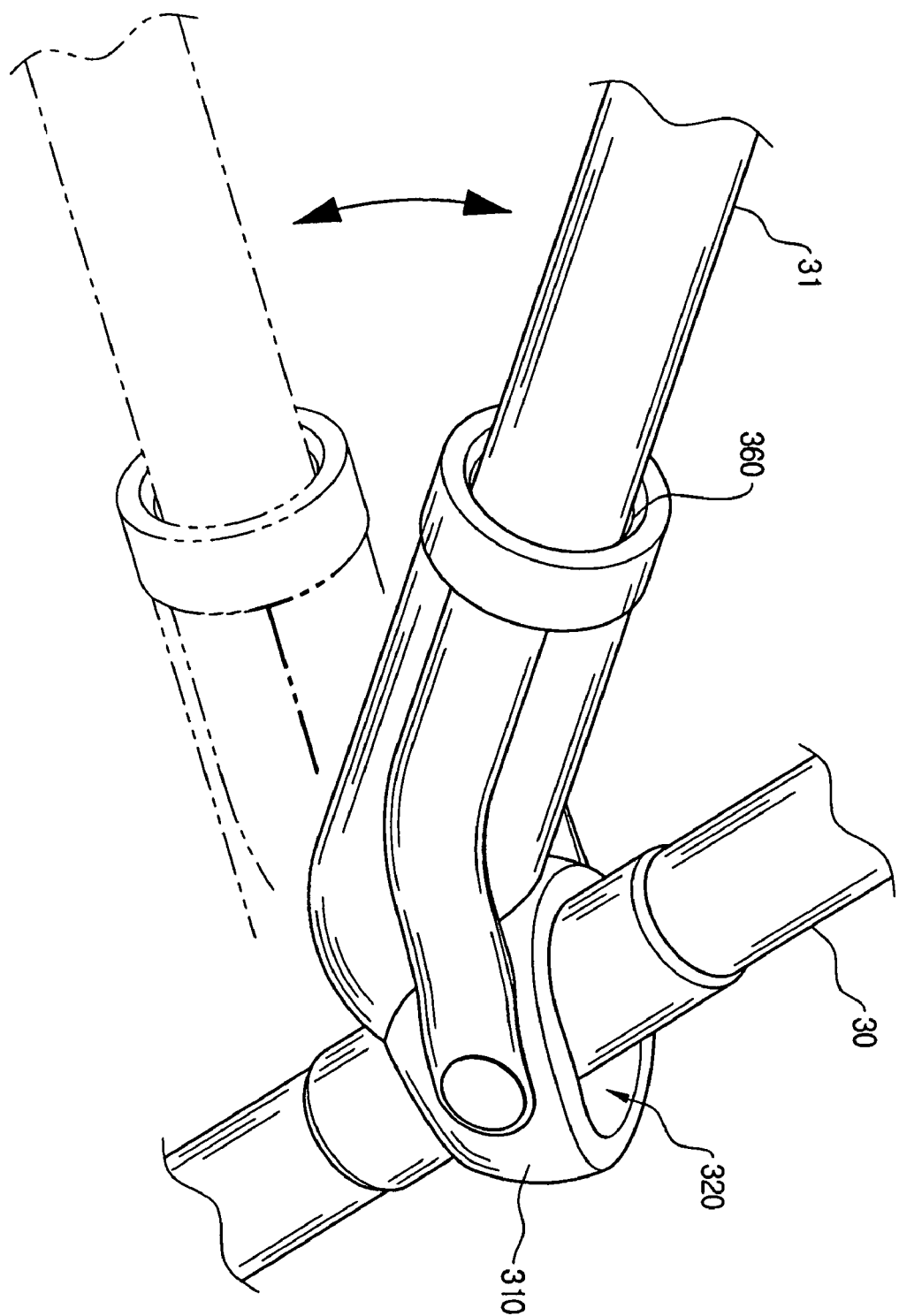
FIG. 24 is a main perspective view showing a state that the connector for tent poles according to the fifth embodiment of the invention is applied to a P2 point of FIG. 26.
Figure 25:
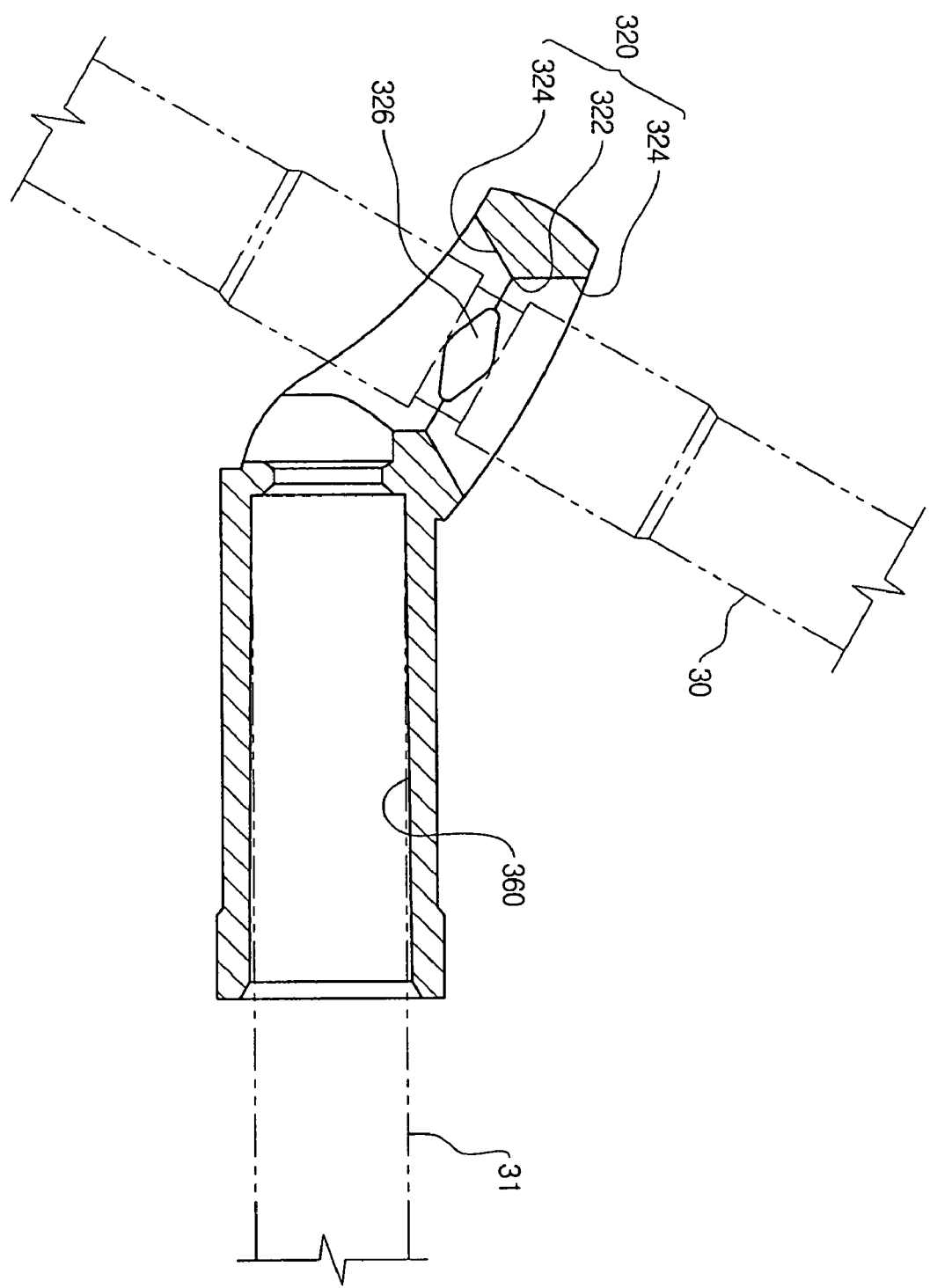
FIG. 25 is a sectional view of FIG. 24.

As shown in FIGS. 24 and 25, the end of the pole assembly 31 for visor is inserted into the insertion recess 360 of the second connection part 350 and the pole assembly 30 of the main body is connected to the pivot hole 320 of the first connection part 310. Then, the pole assembly 31 for visor can swivel within an angle range that the pivot hole 320 allows for the pole assembly 30 of the main body. According to this embodiment, it is possible to most of the visors having various intersecting angles with a single connector and to adjust an angle of the visor mounted.

Embodiment 6

Figure 26:
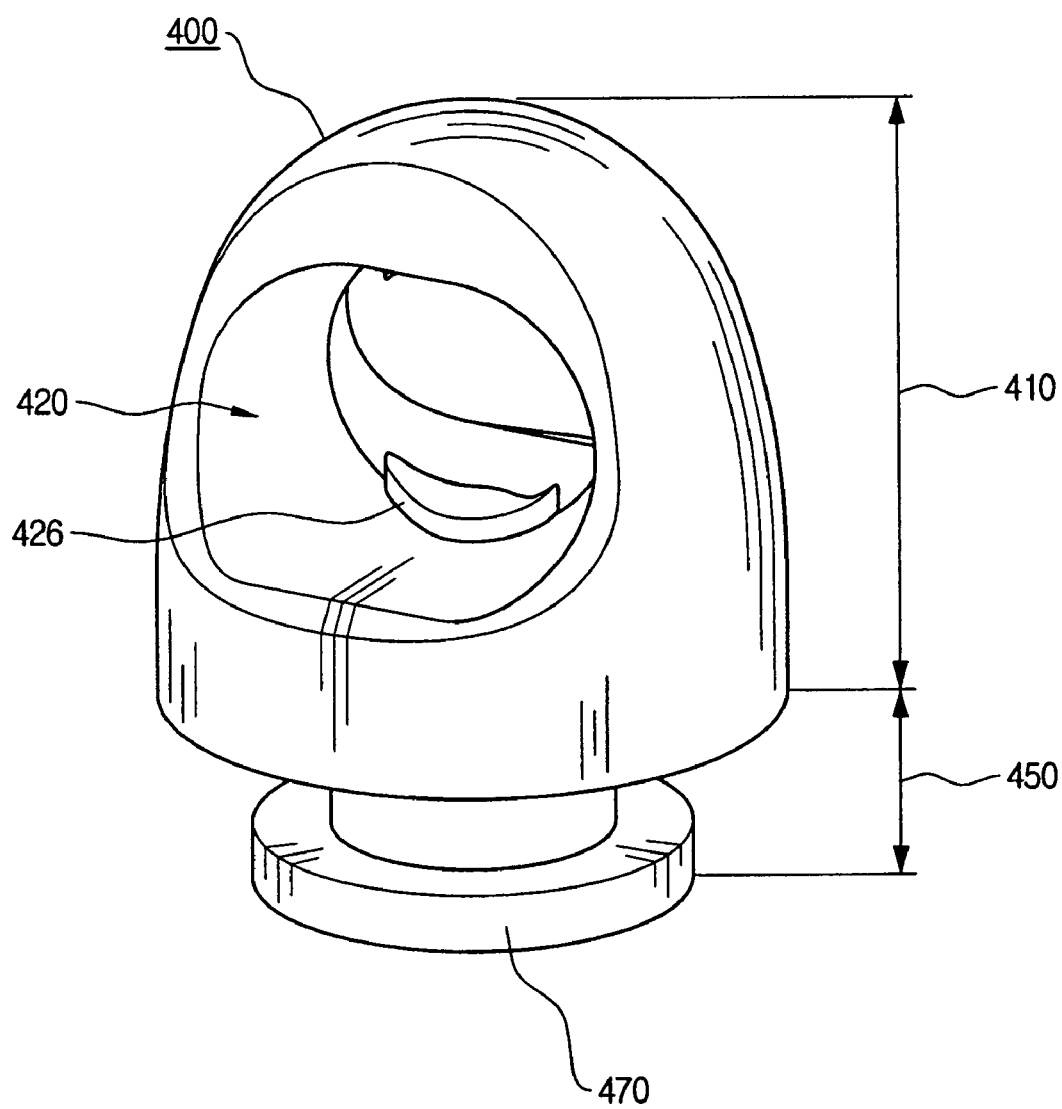
FIG. 26 is a perspective view of a connector for tent poles according to a sixth embodiment of the invention.
Figure 27:
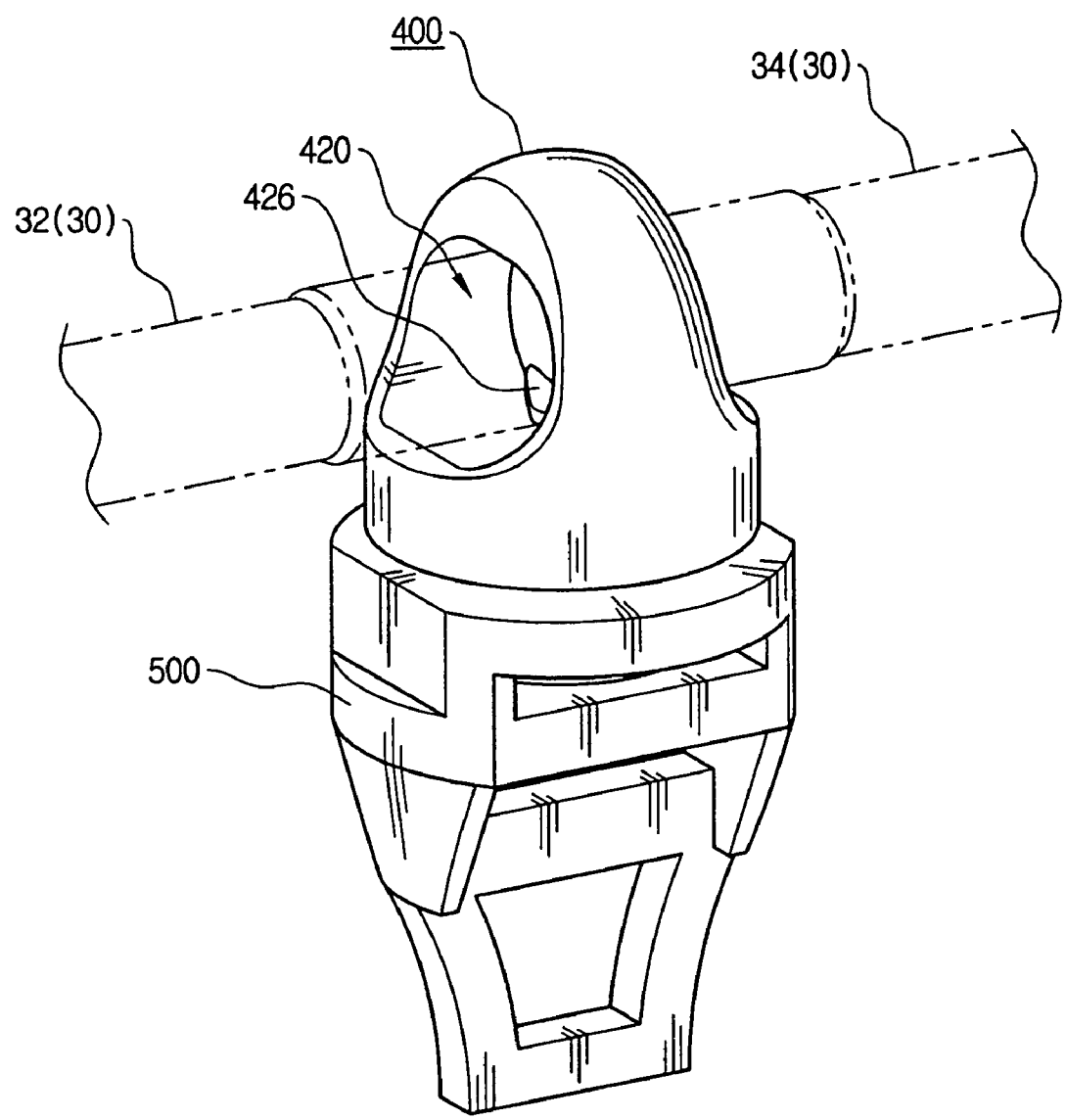
FIG. 27 is a perspective view showing a state that the connector for tent poles according to the sixth embodiment of the invention is connected with a clip.
Figure 28:
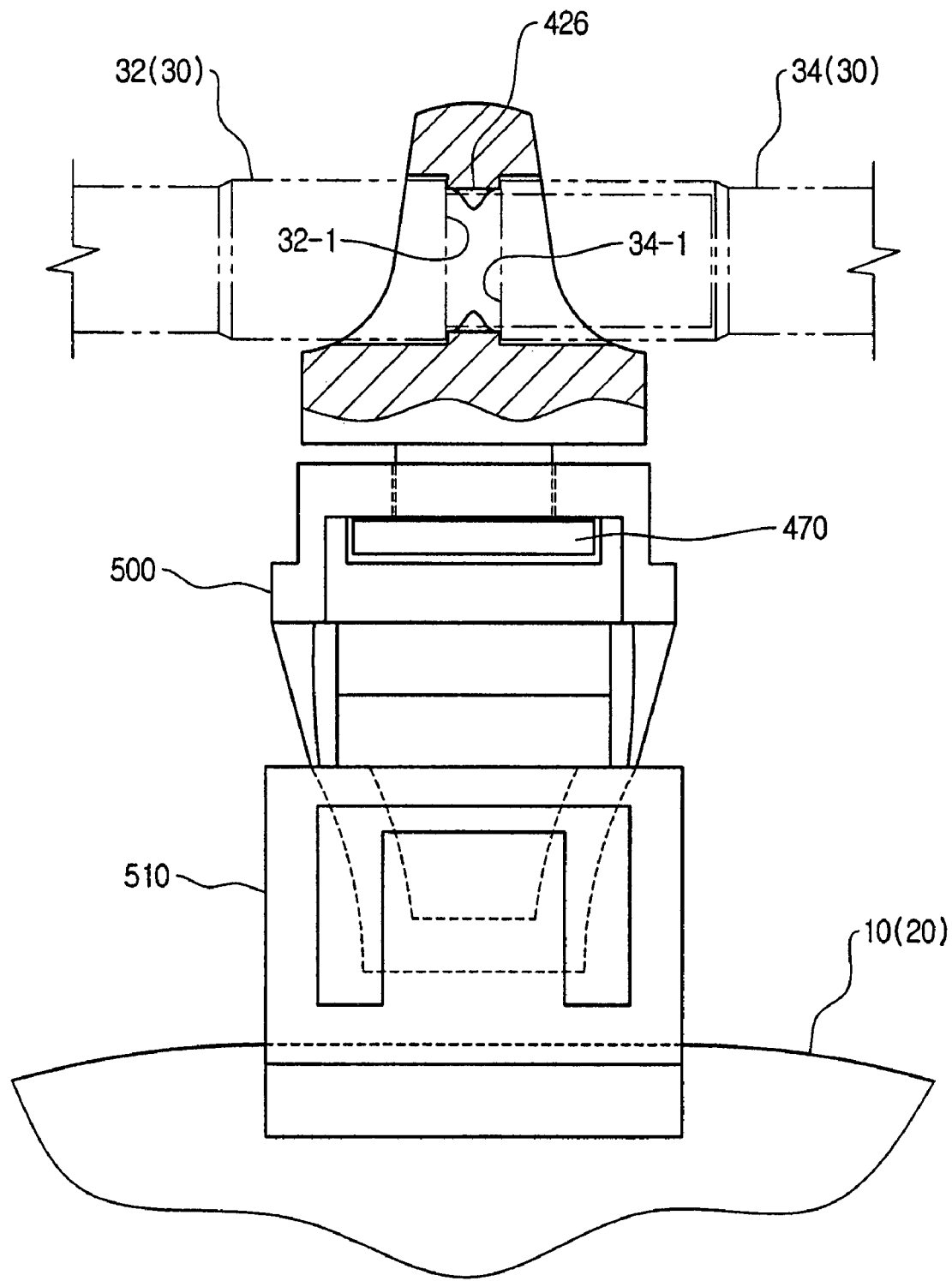
FIG. 28 is a sectional view showing a state that the connector for tent poles according to the sixth embodiment of the invention is mounted to a P3 point of FIG. 26 via a clip.

FIGS. 26 to 28 show a connector for tent poles according to a sixth embodiment of the invention. In the connector of this embodiment, the second connection part consists of only a clip connection part 470 for connecting a conventional clip without the pivot hole or through-hole. In Figs., the first connection part 410 is exemplified as one having a ring shape same as the fourth embodiment. However, it may be such structured that the connector having a cylindrical shape shown in the first embodiment comprises the clip connection part 470 as the second connection part. The first connection part 410 includes a pivot hole 420 and pivot protrusions 426, which are same as the above embodiments.

To the clip connection part 470 of the connector according to this embodiment is connected a conventional clip 500 (for example, 'H-clip'), as shown in FIG. 27.

Figure 29:
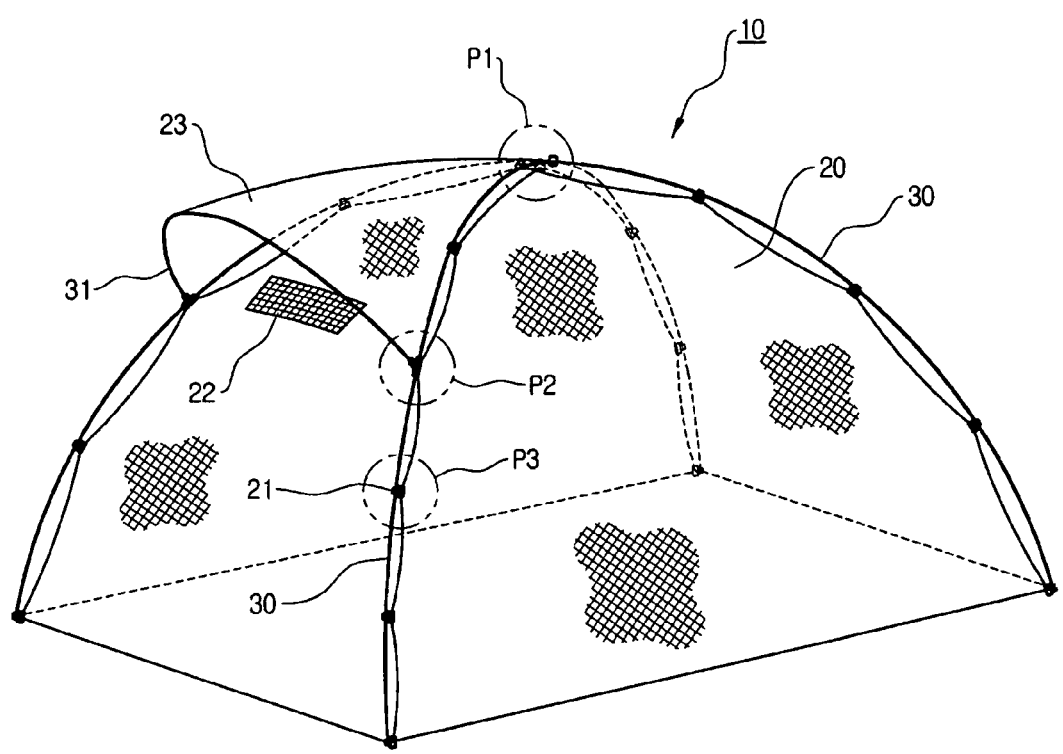
FIG. 29 is a schematic perspective view showing an example of a general tent.
Figure 30:
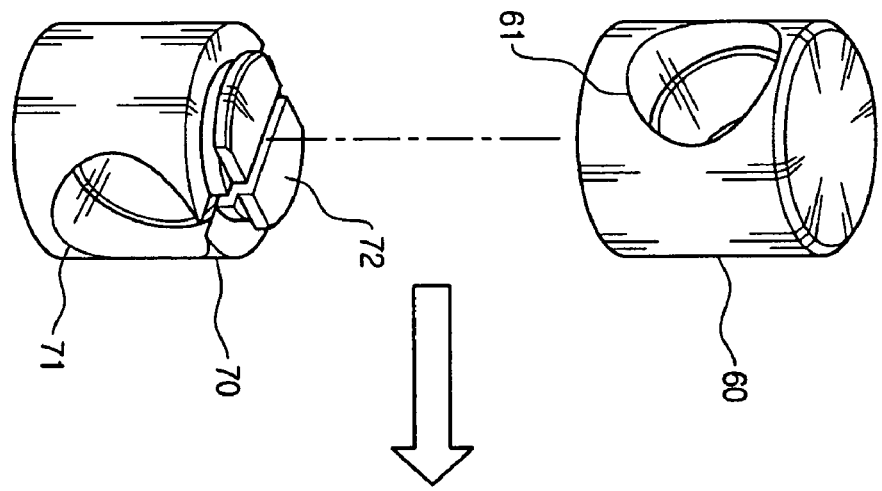
FIG. 30 is a perspective view showing an example of a connector for tent poles according to the prior art.
Figure 30:
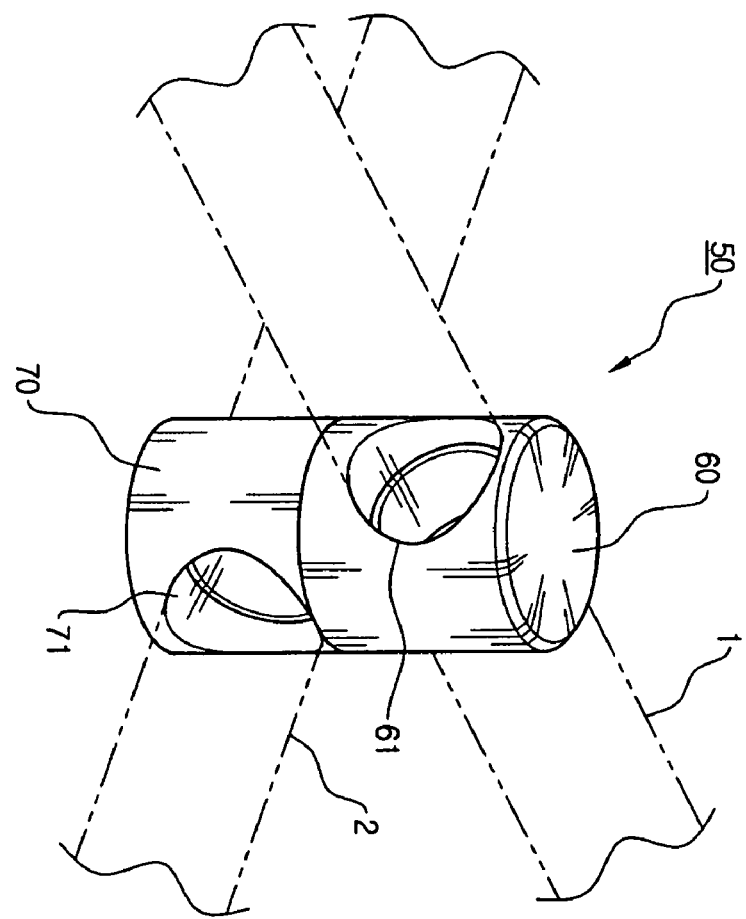
Figure 31:
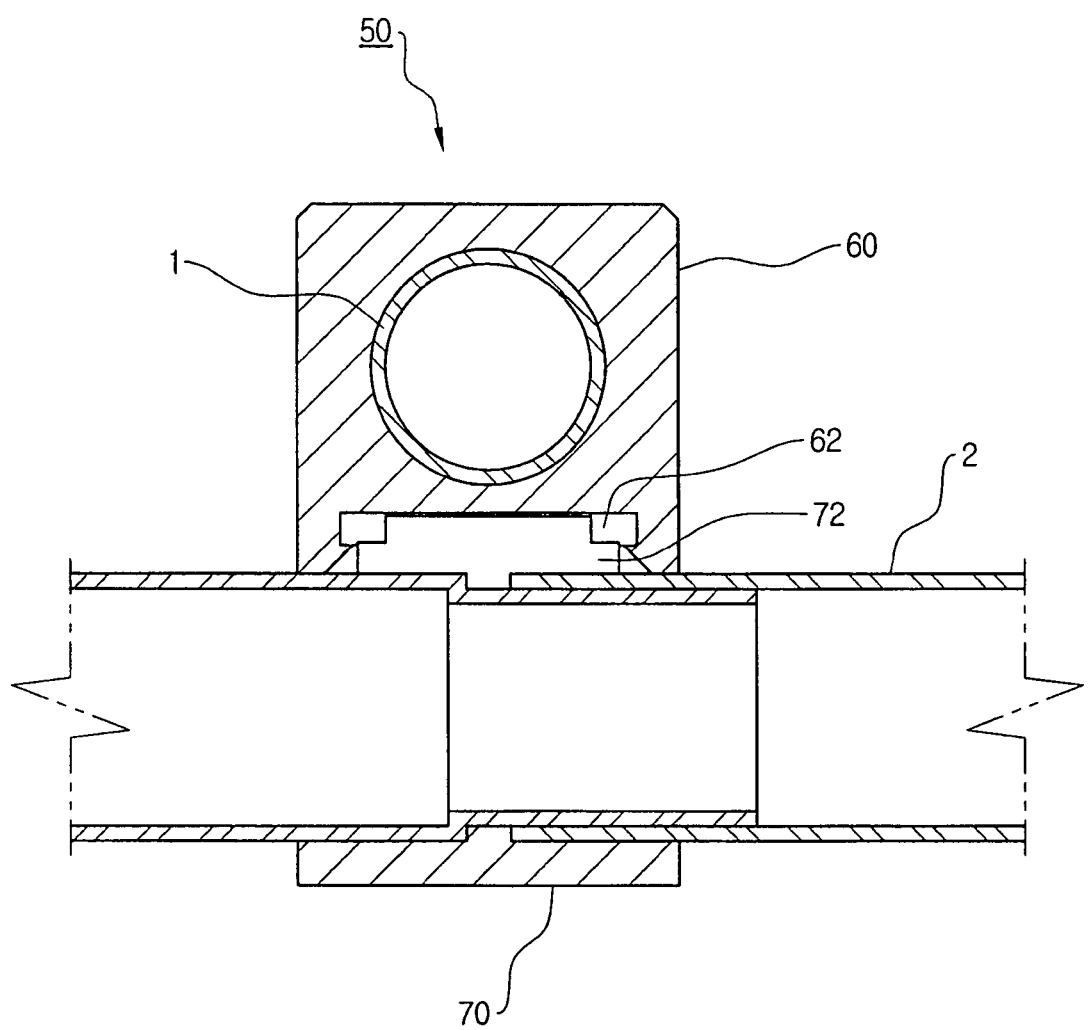
FIG. 31 is a sectional view showing a state that a pole assembly is connected to the connector of FIG. 30.
Figure 32:
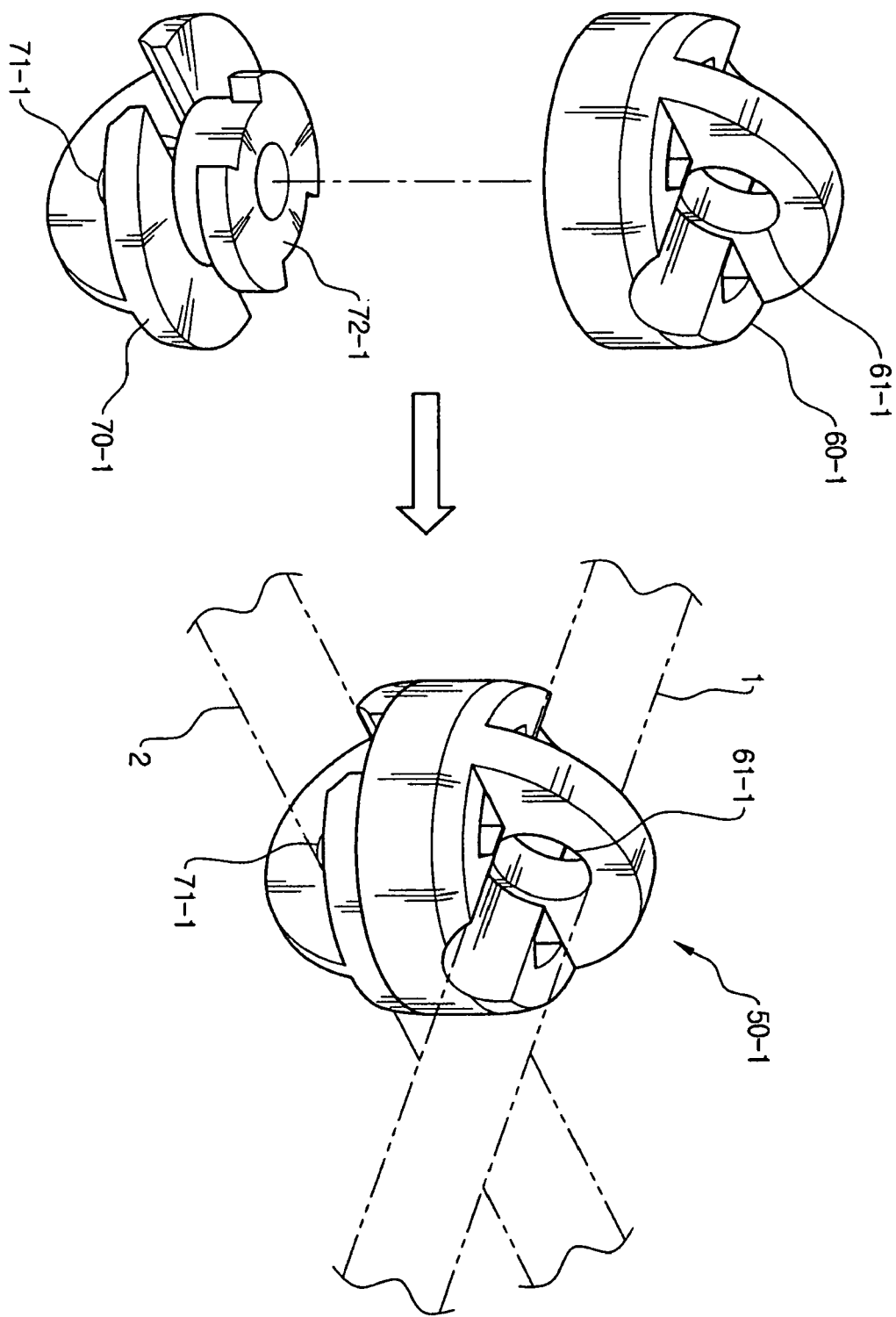
FIG. 32 is a perspective view showing another example of a connector for tent poles according to the prior art.
Figure 33:
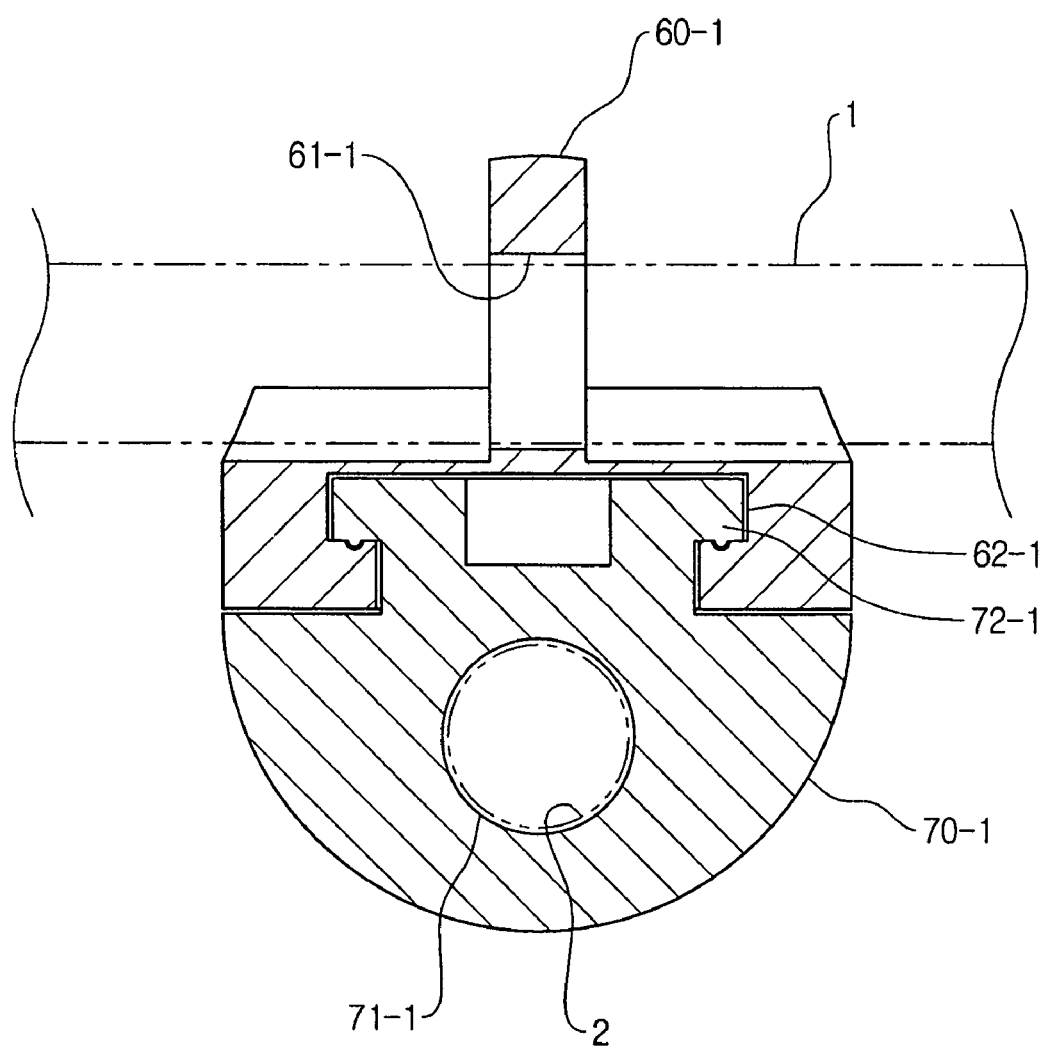
FIG. 33 is a sectional view showing a state that a pole assembly is connected to the connector of FIG. 32.

The connector of this embodiment is a connector that is modified to be suitable for the application to the P3 point of FIG. 29. As shown in FIG. 28, when the pole assembly 30 is connected to the pivot hole 420 of the first connection part 410, the pivot protrusions 426 are fitted between the end face 32-1 of the male pole 32 and the end face 34-1 of the female pole 34. Accordingly, although the pole assembly 30 can swivel within an angle range permitted by the pivot hole 420, it cannot move (slide) in the longitudinal direction due to the pivot protrusions 426. Due to this, the connector for tent poles is restrained from moving to a predetermined point of the pole assembly 30. Like this, the pivot protrusions 426 serve as a stopper. When the connector of this embodiment is connected to a clip 510 that is provided to a tent and is the other party of a pair, as shown in FIGS. 27 and 28, the connector is firmly fixed without sliding, even when it is blowing a gale.

As described above, according to the invention, the connector for tent poles consists of a single body and comprises the special structure of the pivot hole and the pivot protrusions enabling the intersecting pole assemblies to swivel, thereby connecting the pole assemblies in the various intersecting angles. In other words, according to the invention, the structure, in which the connector is divided into several pieces to be combined so as to swivel the pole assemblies, is excluded and the pole assemblies can swivel even when the connector is constructed with a single body. Accordingly, it is possible to achieve a connector for tent poles, which can be inexpensively manufactured and reduce a possibility that the connection part for swiveling will be damaged.

In addition, since the pole assembly or connector does not deviate from a preset point, it is possible to achieve a connector for tent poles, which is stable and firmly situated at a desired mounting point.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. A connector for tent poles comprising:
a body consisting of a single piece as a whole, an approximate half part of the body constituting a first connection part which a single pole assembly passes through and is connected to, the other approximate half part of the body constituting a second connection part to which another pole assembly or a clip is connected; and
a pivot hole enabling the pole assembly to pass through the first connection part of the body and maintaining the pole assembly in a position which allows the pole assembly to swivel in the pivot hole by a predetermined angle, wherein the pivot hole includes,
a base hole formed through the first connection part in a direction traversing a longitudinal axis of the body and having a size corresponding to an outer diameter of the pole assembly at a central point of a cross section of the base hole of the first connection part; and
an expansion hole widely expanded in a radially outward direction of the body from both front and rear sides of the base hole so as to correspond to a swiveling trajectory of the pole assembly so that the pole assembly is able to swivel by the predetermined angle, wherein
pivot protrusions are formed at two points opposite to each other in the base hole of the pivot hole, the pivot protrusions are fitted into a gap between an end face of a male pole and an end face of a female pole of the pole assembly, and have cam surfaces following the swiveling trajectory delineated by the two faces.

2. The connector according to claim 1, wherein the pivot hole of the first connection part is formed with an opening that enables an elastic string of the pole assembly to be introduced.

3. The connector according to claim 1, wherein the second connection part has a pivot hole that is same as the pivot hole of the first connection part so as to connect another pole assembly in a position which allows the another pole assembly to swivel.

4. The connector according to claim 3, wherein a pivot protrusion is formed in the base hole of the pivot hole of the second connection part, which is fitted into a gap between an end face of a male pole and an end face of a female pole of the pole assembly so as to serve as a pivot point combining the swiveling and position-fixing functions of the pole assembly and has a cam surface following a swiveling trajectory delineated by the two end faces.

5. The connector according to claim 3, wherein a penetration direction of the pivot hole of the first connection part is made to be different from a penetration direction of the pivot hole of the second connection part.

6. The connector according to claim 3, wherein at least one of the pivot holes of the first and second connection parts is formed with an opening the enables an elastic string of the pole assembly to be introduced therein.

7. The connector according to claim 3, wherein a clip connection part further extends from an end of the second connection part.

8. The connector according to claim 1, wherein the second connection part has a through-hole through which another pole assembly different from the pole assembly of the first connection part passes.

9. The connector according to claim 8, wherein a stop protrusion is formed at an inner periphery of longitudinal center part of the through-hole of the second connection part, the stop protrusion being fitted in a gap between the end face of the male pole and the end face of the female pole of the pole assembly, thereby blocking longitudinal movements of the male pole and the female pole.

10. The connector according to claim 8, wherein at least one of the pivot hole and the through-hole is formed with an opening that enables an elastic string to pass through the pivot hole or the through-hole.

11. The connector according to claim 8, wherein a clip connection part further extends from an end of the second connection part.

12. The connector-according to claim 1, wherein the second connection part is a clip connection part for connecting a clip.

13. A connector for tent poles comprising:
a cylindrical body consisting of a single piece as a whole; and
pivot holes formed through the cylindrical body in a direction traversing a longitudinal axis of the cylindrical body at two or more points in the longitudinal direction of the cylindrical body,
wherein each pivot hole includes a base hole provided to enable a pole assembly to pass through and to maintain the pole assembly in a position which allows the pole assembly to swivel in the base hole by a predetermined angle, passing through in the direction traversing the longitudinal axis of the body and having a size corresponding to an outer diameter of the pole assembly at a central point of a cross section of the base hole of the body, and an expansion hole widely expanded in a radially outward direction of the cylindrical body from both front and rear sides of the base hole so as to correspond to a swiveling trajectory of the pole assembly so that the pole assembly is able to swivel by the predetermined angle, and wherein each pivot hole is provided with pivot protrusions that are fitted into a gap between an end face of a male pole and an end face of a female pole of the pole assembly and having cam surfaces in each pivot hole following the swiveling trajectory delineated by the two end faces.

* * * * *